(12) United States Patent
Angelopoulos

(10) Patent No.: US 10,418,641 B2
(45) Date of Patent: Sep. 17, 2019

(54) HIGH ACTIVITY PT—BI CATALYST FOR DIMETHYL ETHER ELECTRO-OXIDATION

(71) Applicant: Anastasios Angelopoulos, Cincinnati, OH (US)

(72) Inventor: Anastasios Angelopoulos, Cincinnati, OH (US)

( * ) Notice: Subject to any disclaimer, the term of this patent is extended or adjusted under 35 U.S.C. 154(b) by 200 days.

(21) Appl. No.: 15/381,811

(22) Filed: Dec. 16, 2016

(65) Prior Publication Data

US 2017/0244112 A1 Aug. 24, 2017

Related U.S. Application Data

(60) Provisional application No. 62/297,997, filed on Feb. 22, 2016.

(51) Int. Cl.
*H01M 4/86* (2006.01)
*H01M 4/92* (2006.01)
(Continued)

(52) U.S. Cl.
CPC ........... *H01M 4/926* (2013.01); *B22F 1/0044* (2013.01); *B22F 1/02* (2013.01); *B22F 9/24* (2013.01); *C22C 12/00* (2013.01); *H01M 4/8657* (2013.01); *H01M 4/8663* (2013.01); *H01M 4/921* (2013.01); *B22F 2009/245* (2013.01);
(Continued)

(58) Field of Classification Search
CPC .. H01M 4/8657; H01M 4/8663; H01M 4/921; H01M 4/926; H01M 2250/20; B22F 1/02; B22F 1/0044; B22F 9/24; B22F 2009/245; B22F 2301/30; B22F 2998/10; C22C 12/00; Y02T 90/32
See application file for complete search history.

(56) References Cited

U.S. PATENT DOCUMENTS 8,435,429 B2 5/2013 Rowe

OTHER PUBLICATIONS

S. St. John et al, "Synthesis and Characterization of Electrocatalytically Active Platinum Atom Clusters and Monodisperse Single Crystals," J. Phys. Chem. C 114 (2010) 13515-13525.*
(Continued)

*Primary Examiner* — Brittany L Raymond
(74) *Attorney, Agent, or Firm* — Dinsmore & Shohl LLP

(57) ABSTRACT

Provided are processes for preparing a thermodynamically stable $PtBi_2$ alloy nanoparticle. In certain aspects, the process comprises preparing an aqueous mixture, with the aqueous mixture comprising: an inorganic compound comprising $SnCl_2$, an inorganic compound comprising Bi; and HCl. The process further comprises adding $PtCl_4$ to the mixture. The process results in the spontaneous reduction of Bi and Pt. Excess $SnCl_2$ is adsorbed as a ligand at the surface of the $PtBi_2$ alloy nanoparticle, which serves to stabilize the nanoparticle. Another aspect provides a thermodynamically stable $PtBi_2$ nanoparticle. The nanoparticle comprises a core comprising a $PtBi_2$ alloy. The nanoparticle further comprises a shell at least partially encapsulating the core, with the shell comprising stannous chloride. The thermodynamically stable $PtBi_2$ nanoparticle has a negative charge.

23 Claims, 17 Drawing Sheets

(51) Int. Cl.
  C22C 12/00  (2006.01)
  B22F 1/00   (2006.01)
  B22F 1/02   (2006.01)
  B22F 9/24   (2006.01)
(52) U.S. Cl.
  CPC ....... B22F 2301/30 (2013.01); B22F 2998/10 (2013.01); H01M 2250/20 (2013.01); Y02T 90/32 (2013.01)

(56) References Cited

OTHER PUBLICATIONS

H. W. Kirby et al, "Reduction of Bismuth Chloride by Stannous Chloride," Ind. Eng. Chem. 1956, 48 (10), 1949-1950.*
C. Jeyhabbarathi et al, "Methanol Tolerant Oxygen-Reduction Activity of Carbon Supported Platinum-Bismuth Bimetallic Nanoparticles," J Appl Electrochem (2009) 39: 45-53.*
Hubert A. Gasteiger et al, "Activity benchmarks and requirements for Pt, Pt-alloy, and non-Pt oxygen reduction catalysts for PEMFCs," App. Cat. B 2005, 56 (1-2), 9-35.
Jose Solla-Gullon et al, "Surface characterization of platinum electrodes," Phys. Chem. Chem. Phys. 10 (2008) 1359-1373.
Yan Liu et al, "Electro-oxidation of dimethyl ether on Pt/C and PtMe/C catalysts in sulfuric acid," Electrochim. Acta 2006, 51 (28), 6503-6509.
H. Bonnermann et al, "Selective Oxidation of Glucose on Bismuth-Promoted Pd—Pt/C Catalysts Prepared from NOct4Cl-Stabilized Pd—Pt Colloids," Inorganica Chimica Acta 270 (1998) 95-100.
Chandrani Roychowdhury et al, "Synthesis, Characterization, and Electrocatalytic Activity of PtBi Nanoparticles Prepared by the Polyol Process," Chem. Mater. 2005, 17, 5871-5876.
Chandrani Roychowdhury et al, "Synthesis, Characterization, and Electrocatalytic Activity of PtBi Nanoparticles Prepared by Borohydride Reduction in Methanol," Chem. Mater. 2006, 18, 3365-3372.
Dingguo Xia et al, "Synthesis of Ordered Intermetallic $PtBi_2$ Nanoparticles for Methanol-Tolerant Catalyst in Oxygen Electroreduction," Chem. Mater. 2006, 18, 5746-5749.
L. Robert Baker et al, "The Role of an Organic Cup in Nanoparticle Catalysis: Reversible Restructuring of Carbonaceous Material Controls Catalytic Activity of Platinum Nanoparticles ofr Ethylene Hydrogenation and Methanol Oxidation," Catal Lett (2012) 142: 1286-1294.

* cited by examiner

FIG. C

HIGH ACTIVITY PT—BI CATALYST FOR DIMETHYL ETHER ELECTRO-OXIDATION

CROSS REFERENCE TO RELATED APPLICATION

This application claims priority under 35 U.S.C. § 119(e) to U.S. Provisional Application Ser. No. 62/297,997, filed Feb. 22, 2016, which application is hereby incorporated by reference in its entirety.

FIELD

The invention relates generally to the field of electrocatalysis. More specifically, the invention relates to processes for preparing thermodynamically stable $PtBi_2$ alloy nanoparticles, and thermodynamically stable $PtBi_2$ nanoparticles produced by such processes. The thermodynamically stable $PtBi_2$ can serve as high activity catalysts for dimethyl ether electro-oxidation.

BACKGROUND

A fuel cell is an electrochemical cell comprising two electrodes separated by an electrolyte. The fuel in the electrochemical cell oxidized to produce electricity on demand. The fuel is depleted during operation and must be replenished. Hydrogen, methanol, and ethanol, are examples of fuel that have been used in fuel cells. A fuel is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Dimethyl ether (DME) is a clean-burning alternative to diesel fuel that meets strict emissions standards in combustion engines. DME is derived from natural gas but can also be synthesized from biomass on-site. As such, DME is a sustainable and highly distributed energy source. DME has properties similar to propane and can utilize established fueling infrastructure and handling procedures. In addition to its use in internal combustion engines, the convenience of DME generation and transport can be exploited to overcome the high-pressure requirements of hydrogen fuel in more efficient electrochemical fuel cells. Fuel cell-driven vehicle efficiencies are among the highest of all vehicle technologies. The electrochemical process with half-cell potentials is as follows:

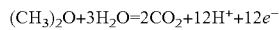  Anode:

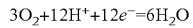  Cathode:

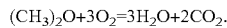  Overall:

Relative to other non-hydrogen fuels envisioned for use in electrochemical cells, DME has many advantages. DME is a nontoxic substance and is more energy-dense than hydrogen. DME has a lower dipole moment than methanol which limits fuel crossover from anode to cathode. Additionally, DME is the simplest ether, and can be more efficiently oxidized than ethanol through electrocatalytic C—O bond cleavage. Unlike ethanol, DME does not interfere with world food production.

However, a key obstacle to the commercial realization of DME fuel cells is the identification of a suitable electrocatalyst. Despite previous investigations on the use of DME in operating fuel cells, few studies provide fundamental electrochemical characterization of highly dispersed electrocatalysts required in practical fuel cell design. In one such study, the most active electrocatalyst for DME oxidation at low current densities was found to be highly dispersed commercial PtRu alloy nanoparticles supported on carbon (PtRu/C). The potential observed at a slow scan cyclic voltammetry (CV) oxidation current of 0.05 A/gPt was 0.30 V versus RHE, or 0.15 V below that of commercial Pt on carbon in IM DME-saturated $H_2SO_4$ solution. Chronoamperometry yielded a stable mass activity of greater than 1 A/gPt at 0.40 V vs RHE, or more than an order of magnitude higher than that of commercial Pt/C catalyst under the same solution conditions. This increase is ascribed to the incomplete oxidation of DME to CO at low potentials in the case of pure Pt, as well as to the ability of alloyed Ru to activate $H_2O$ adsorption and promote CO conversion to $CO_2$. However, at higher potentials (e.g., approaching a peak potential at 0.8 V), the activity of Pt/C was found to be much greater than that of PtRu/C, presumably due to reduced Pt surface area in the alloy. This finding was confirmed in operating DME fuel cells, where electrocatalysts with increasing Ru concentration relative to Pt exhibit lower potential at reaction kinetic-limited currents.

Consequently, there is a continuing need in the art for more efficient fuel cell catalysts than commercially available PtRu—C or Pt/C. Such new catalyst would enable the utilization of DME as a bridge-fuel until hydrogen infrastructure becomes sufficiently widespread. Thus, there is a need thus for: (i) synthesis of new materials with more efficient and higher catalytic activity; (ii) new methods for synthesis of these new materials and their precursor materials; and (iii) fuel cells employing these new materials.

SUMMARY

It is understood that both the following summary and the detailed description are exemplary and explanatory and are intended to provide further explanation of the disclosure as claimed. Neither the summary nor the description that follows is intended to define or limit the scope of the disclosure to the particular features mentioned in the summary or description.

One object is to provide for the synthesis of more efficient fuel cell catalysts than commercially available catalysts, and new methods of synthesis for these new catalysts, in order to enable the utilization of DME fuel cells. This object is achieved in the present disclosure that provides processes for preparing thermodynamically stable $PtBi_2$ alloy nanoparticles. In certain aspects, the process comprises preparing an aqueous mixture, with the aqueous mixture comprising: an inorganic compound comprising $SnCl_2$; an inorganic compound comprising Bi; and HCl. The process further comprises adding $PtCl_4$ to the mixture. The process results in the spontaneous reduction of Bi and Pt. Excess $SnCl_2$ is adsorbed as a ligand at the surface of the $PtBi_2$ alloy nanoparticle, which serves to stabilize the nanoparticle.

Another aspect provides a thermodynamically stable $PtBi_2$ nanoparticle. The nanoparticle comprises a core comprising a $PtBi_2$ alloy. The nanoparticle further comprises a shell at least partially encapsulating the core, with the shell comprising an organic compound comprising stannous and chloride. In some aspects, the thermodynamically stable $PtBi_2$ nanoparticle has a negative charge, while in other aspects the thermodynamically stable PtBi2 nanoparticle has a partial negative charge.

These and additional aspects and features of the instant invention will be clarified by reference to the figures and detailed description set forth herein.

BRIEF DESCRIPTION OF THE DRAWING

FIG. 2A shows spherical $PtBi_2$ alloy nanoparticles produced using co-reductions synthesis scheme. FIG. 2B shows hexagonal nanoplatelets of pure Bi synthesized using Sn/Bi=3 in 0.001M HCl. Inset is high magnification of surface showing crystalline structure. FIG. 3C shows $PtBi_2$ alloy nanoparticles having hexagonal nanoplatelet morphology. Synthesis was achieved via Bi metal precursor NP particle formation as in FIG. 2B, followed by Pt reduction.

FIG. 6A-C shows XRD patterns of various nanoparticles produced in this instant disclosure. FIG. 6A shows pure Bi nanoplatelets (*→indicate the metallic Bi; x→indicate $BiO_x$). FIG. 6B shows a $PtBi_2$—N sample synthesized via metallic Bi precursor process. FIG. 6C shows a $PtBi_2$/C sample synthesized via co-reduction.

FIG. 7A depicts $PtBi_2$/C. FIG. 7B shows $PtBi_2$—N. FIG. 7C shows Pt/C.

FIG. 9A shows Pt/C. FIG. 9B shows PtBi2/C, and FIG. 9C shows PtBi2-N. The currents are normalized by the mass of Pt each electrode contains.

FIG. 11A shows currents normalized by mass of Pt each electrode. FIG. 11B shows currents normalized by the ECSA of each electrode for Pt/C (solid), $PtBi_2$/C (dashed) and $PtBi_2$—N (solid).

FIG. 13A shows a HAADF-STEM image. FIG. 13B shows the Pt element distribution. FIG. 13C shows the Bi element distribution.

FIG. 17A shows Pt/C. FIG. 17B shows $PtBi_2$/C. FIG. 17C shows $PtBi_2$—N.

DETAILED DESCRIPTION

Figure 1:
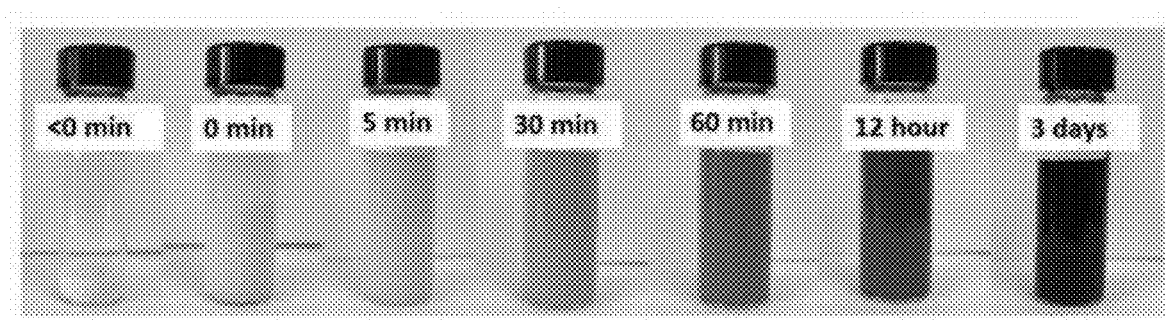
FIG. 1 shows the color changes with the time during the reaction between Sn and Bi in 0.001 M HCl. From left to right are before adding acid, after adding acid, 5 minutes, 30 minutes, 1 hours, 12 hours, and 3 days. Sn/Bi=3, Sn/Pt=9

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes and compositions are described as using specific a specific order of individual steps or specific materials, it is appreciated that steps or materials may be interchangeable such that the description of the invention may include multiple steps or parts arranged in many ways as is readily appreciated by one of skill in the art.

The terminology used herein is for describing particular aspect only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

In some aspects, the presently disclosed data relates to a new synthesis approach based on the use of stannous chloride as a simultaneous reducing and stabilizing ligand. Broadly, the nanoparticle synthesis involves mixing of stannous chloride with bismuth chloride (or alternatively, bismuth oxide) in hydrochloric acid. Spontaneous reduction of Bi ad Pt occurs, while excess stannous chloride adsorbs as a ligand at the surface to stabilize the growing nanoparticle. Nanoparticle growth proceeds via primary particle accretion into select nuclei followed by diffusion of remaining primary particles to the nuclei. Surface-ligand attachment permits re-arrangement necessary to form pure metal cores, with the ligands segregating to the surface. The ratio of Sn to Bi and Pt controls the size at which growth stops (i.e., the surface to volume ratio has decreased enough to protect the entire available metallic nanoparticle surface with a uniform stannous chloride shell). Before the present disclosure, ligand formation between Sn and Bi has not been previously explored. Importantly, in some aspects, the processes are an all-aqueous, all-inorganic process. Additionally, in some aspects, the presently disclosed processes avoid the use of organic solvents and hazardous reducing agents, such as but not limited to hydrazine.

The present disclosure relates to two approaches to inorganic ligand based nanoparticle synthesis to product $PtBi_2$ alloy nanoparticles. The first approach is a one-pot co-reduction of Pt and Bi to produce a $PtBi_2$ alloy. This approach results in the formation of monodisperse, spherical $PtBi_2$ alloy nanoparticles (approximately from about 2 nm to about 5 nm) in electrostatically stabilized aqueous suspensions. The second approach is a two-stage synthesis method involving the initial formation of a bismuth metal precursor nanoparticle, followed by Pt reduction to form the $PtBi_2$ alloy. The Bi core does not persist subsequent to synthesis. This second approach results in the formation of larger, non-uniform $PtBi_2$ alloy nanoplatelets in electrostatically stabilized aqueous suspensions. Importantly, the presently disclosed processes result in PtBi2 alloy nanoparticle formation without the need for high temperature annealing. As Bi is well known to be unstable in the high salt, low pH environment required for $SnCl_3^-$ surfactant formation and therefore, these synthesis routes are unexpected. Previously, the potential for $SnCl_3^-$ ligand attachment to Bi was not recognized. Consequently, the successes with $BiPt_2$ alloy nanoparticle synthesis using this unique inorganic ligand approach are very surprising.

As such, processes for preparing a thermodynamically stable $PtBi_2$ alloy nanoparticle are disclosed. In some aspects, the process comprises preparing an aqueous mixture. The aqueous mixture comprises an inorganic compound comprising $SnCl_2$, an inorganic compound comprising Bi, and HCl. The process further comprises adding $PtCl_4$ to the mixture. The process results in the spontaneous reduction of Bi and Pt, and excess stannous chloride adsorbs as a ligand at the surface of the $PtBi_2$ alloy nanoparticle. This excess stannous chloride that is absorbed as a ligand at the surface of the $PtBi_2$ alloy nanoparticle to stabilize the nanoparticle.

In some aspects, the inorganic compound comprising bismuth is selected from $Bi_2O_3$ or $BiCl_3$. In other aspects, the inorganic compound comprising bismuth is selected from a solution of $Bi_2O_3$ in HCl or a $BiCl_3$ solution. In some aspects, the $SnCl_2$ is $SnCl_2 \cdot 2H_2O$. In other aspects, the inorganic compound comprising $SnCl_2$ is a solution comprising $SnCl_2$ and HCl. In other aspects, the inorganic compound comprising $SnCl_2$ is a solution comprising $SnCl_2 \cdot 2H_2O$ in HCl. In some aspects, the $PtCl_4$ is a solution comprising $PtCl_4$ and HCl.

In certain aspects, the process comprises a one-pot reduction of Pt and Bi to form the thermodynamically stable $PtBi_2$ alloy nanoparticles. As previously described, this approach results in the formation of monodisperse, spherical $PtBi_2$ alloy nanoparticles (approximately from about 2 nm to about 5 nm) in electrostatically stabilized aqueous suspensions.

In certain aspects, the step of preparing the aqueous mixture results in the formation of a Bi nanoparticle. Thus, in some aspects the process includes the initial formation of a bismuth metal precursor nanoparticle. In some aspects, the process further comprises adding an inorganic compound comprising $SnCl_2$ to the mixture. In certain aspects, the $SnCl_2$ is $SnCl_2 \cdot 2H_2O$. In other aspects, the inorganic compound comprising $SnCl_2$ is a solution comprising $SnCl_2$ in HCl. Thus, in some aspects, the $PtBi_2$ alloy nanoparticle formation begins when the mixture of the solution of pre-made Bi nanoparticles and $PtCl_4$ (which in certain embodiments can be a solution of $PtCl_4$ in HCl) is added to $SnCl_2$ in HCl. In certain aspects, the process results in Pt reduction to form the thermodynamically stable $PtBi_2$ alloy nanoparticles. As previously described, this approach results in the formation of larger, non-uniform $PtBi_2$ alloy nanoplatelets in electrostatically stabilized aqueous suspensions.

In some aspects, the process does not comprise the use of organic solvents. In some aspects, the process does not comprise hazardous reducing agents. In some aspects, the process is entirely aqueous. In some aspects, the process does not comprise high temperature annealing.

The presently disclosed data demonstrates that the approach can produce well-defined metal alloy nanoparticle structures. As synthesized, the nanoparticles retain a native (covalently bonded) surface charge that facilitates their assembly into commercial carbon supports for electrode preparation. These charges permit layer-by-layer assembly of the metal nanoparticle in an all-aqueous process and eliminate the need for more complex ligand-exchange approaches proposed by others.

As such, in some aspects thermodynamically stable $PtBi_2$ nanoparticles are disclosed. In some aspects, the thermodynamically stable $PtBi_2$ nanoparticles comprise a core and a shell at least partially encapsulating the core. In certain aspects, a shell fully encapsulates the core. In some aspect, the core of the nanoparticles comprises a $PtBi_2$ alloy. In some aspects, the shell encapsulating the core comprises an organic compound comprising stannous and chloride. Depending on the on chloride ion concentration in the solution, the shell encapsulating the core can comprise $SnCl_2$, $SnCl_3^-$, and/or $SnCl_4^{2-}$. Thus, in certain aspects, the shell encapsulating the core comprises $SnCl_2$. In other aspects, the shell encapsulating the core comprises $SnCl_3^-$. In further aspects, the shell encapsulating the core comprises $SnCl_4^{2-}$. In certain aspects, the thermodynamically stable $PtBi_2$ nanoparticle has a negative charge. In other aspects, thermodynamically stable $PtBi_2$ nanoparticle has a partial negative charge. In some aspects, the thermodynamically stable $PtBi_2$ nanoparticles are in electrostatically stabilized aqueous suspensions.

In some aspects, the thermodynamically stable $PtBi_2$ nanoparticles are spherical. In some aspects, the thermodynamically stable PtBi2 nanoparticles are monodisperse. In some aspects, the spherical nanoparticles have a particle size of from about 2 nm to about 5 nm. In some aspects, the nanoparticle is a nanoplatelet. In some aspects, the nanoplatelet has a particle size of from about 5 nm to about 1 am. In certain aspects, the nanoplatelet has a hexagonal morphology.

In some aspects, the instantly disclosed processes further include the use of a carbon powder which serves as a support for the $PtBi_2$ nanoparticles and allows for a maintained dispersion and maximized exposure of the $PtBi_2$ nanoparticle surface area. The $PtBi_2$ alloy nanoparticles will adhere to the surface of the underlying carbon. In this case, the nanoparticles are referred to as carbon-supported nanoparticles. Thus, in certain aspects, the spherical $PtBi_2$ nanoparticles are carbon supported, and are referred to as $PtBi_2/C$. Processes for producing carbon supported nanoparticles are known in the art. For example, a layer a cationic polyacrylamide can be used to absorb $PtBi_2$ alloy nanoparticles on the surface of a carbon support, such as Vulcan-XC72. In certain aspects, the $PtBi_2$ nanoplatelets are too large and the suspension containing these nanoplatelets is not sufficiently stable to take advantage of electrostatic assembly on carbon. Thus, in some aspects, these nanoplatelets can be used in unsupported form and are referred to as $PtBi_2$—N.

In certain aspects, a catalyst ink may be prepared from the $PtBi_2$ alloy nanoparticles, including $PtBi_2$/C and/or $PtBi_2$—N nanoparticles, as in known in the art. For example, a catalyst ink may be prepared by admixing the $PtBi_2$/C and/or $PtBi_2$—N nanoparticles and a solvent. The solvent may comprise isopropyl alcohol, propyl alcohol, acetone, or other solvent, without limitation. In certain instances, the solvent comprises isopropyl alcohol. The suspended $PtBi_2$/C and/or $PtBi_2$—N nanoparticles is mechanically agitated for any period suitable to disperse the $PtBi_2$/C and/or $PtBi_2$—N nanoparticles in the solvent. Further, the catalyst ink may be ultrasonicated.

In some aspects, a suitable copolymer is admixed with the ultrasonicated catalyst ink. In certain embodiments, the copolymer is added to the catalyst ink after mechanical agitation, during ultrasonication with the solvent, or alternatively, after ultrasonication with the solvent. In certain aspects, a suitable copolymer, is a sulfonated tetrafluoroethylene copolymer (such as NAFION®). However, it is understood by one skilled in the art that any suitable copolymer may be utilized. The copolymer/catalyst ink mixture may be dispersed by ultrasonicating for a suitable time period.

In some aspects, the catalyst ink or dispersed copolymer/catalyst ink mixture is used to make a catalyst layer, such as a catalyst-coated membrane. In some aspects, a catalyst layer, such as a catalyst-coated membrane, may be used to fabricate membrane electrode assemblies. In certain aspects, the catalyst layer may be used in an electrochemical cell, such as a fuel cell.

In some aspects, de-alloyed catalysts are made from the instantly disclosed $PtBi_2$ alloy nanoparticles (including the $PtBi_2$/C, $PtBi_2$—N, catalyst ink, and/or dispersed copolymer/catalyst ink mixture) by suitable leaching processes, such as electrochemical dealloying, chemical dealloying, or by heating in a controlled gaseous atmosphere, such as, but not limited to, nitrogen, oxygen, hydrogen, carbon monoxide and nitrogen monoxide. In some aspects, a suitable leaching process includes electrochemical dealloying. Thus, in some aspects, a suitable leaching process includes subjecting the $PtBi_2$ alloy nanoparticles (including the $PtBi_2$/C, $PtBi_2$—N, catalyst ink and/or dispersed copolymer/catalyst ink mixture) to an electrochemical reaction, which could be performed in situ (e.g. performing electrochemical cycling on an electrode assembly, such as membrane electrode assembly, comprising the $PtBi_2$ alloy nanoparticles).

In some aspects, a suitable leaching process includes chemical dealloying. In some aspects, the $PtBi_2$ alloy nanoparticles may be dealloyed the nanoparticle catalysts chemically, without forming a membrane electrode assembly or electrochemical cell. Thus, in certain aspects, chemical de-alloying may further comprise ex-situ de-alloying. In chemical de-alloying embodiments, the $PtBi_2$ alloy nanoparticles are treated with strong acid, alternatively a mineral acid. In some embodiments, the strong acid may comprise any strong hydrogen donating acid, such as, without limitation, acetic, hydrochloric, nitric acid, perchloric acid, hydro-bromic acid, hydro-iodic acid, sulfuric acid, or combinations thereof. After acid treatment, the dealloyed $PtBi_2$ nanoparticles are activated catalysts. In embodiments, the activated catalysts may be used to form an electrode assembly, such as a membrane electrode assembly.

Nanoparticle assembly is essential to the ex-situ fabrication of high surface-area electrodes. Subsequent chemical stripping of the Bi component results in a "one-pot" de-alloyed nanoparticle synthesis approach in contrast to the more extensive approach previously described with respect to Pt—Cu and Pt—Co alloy nanoparticle precursors. The dealloyed $PtBi_2$ nanoparticles yield unprecedented DME electrooxidation mass activities approaching those of hydrogen on pure Pt. As such, the presently-disclosed processes provide for the scalable production of $PtBi_2$ alloy nanoparticle precursors, as well as efficient and high activity dealloyed $PtBi_2$ and dealloyed Pt nanoparticle electrocatalysts. Such dealloyed $PtBi_2$ and dealloyed Pt nanoparticles are suitable for use in electrocatalytic processes and devices. Therefore, the instantly disclosed nanoparticles as described may be used as an electrode in a fuel cell. In certain aspects, the fuel cell is a DME fuel cell. This application is, however, merely exemplary and is being used to describe a possible implementation of the present invention. Implementation as a fuel cell electrode is know in the art. It is to be understood that there are many possible applications which may include, but are not limited to various other types of electrochemical or catalytic devices.

The foregoing description is illustrative of particular aspects of the invention, but is a limitation upon the practice thereof. In order that various aspects may be more readily understood, reference is made to the following examples which are intended to illustrate various aspects, but do not limit the scope thereof.

EXAMPLES

The following examples are given by way of illustration and are in no way intended to limit the scope of the present invention.

Example 1

Materials and Methods 1.1 Nanoparticle Synthesis

Two approaches to inorganic ligand based NP synthesis were investigated. The first entails one-pot co-reduction of Pt and Bi to produce an alloy while the second is a two-stage synthesis method involving the initial formation of a bismuth metal precursor NP followed by Pt reduction to form the alloy. For each synthesis method, the ratios of Sn/Bi and Sn/Pt in the starting solutions were as indicated, but were found to not influence the final Pt—Bi alloy composition obtained (which in every case was the thermodynamically stable PtBi2).

1.1.1 Co-Reduction Process

The Pt source of this synthesis route was prepared by dissolving 1 g of $PtCl_4$ [Alfa Aesar, platinum(IV) chloride 99.9% (formula weight (FW)=336.89 g/mol)] in 100 mL of 7.5 M HCl (62 mL concentrated HCl+38 mL DI water). This is the Pt source for the synthesis. A mass of 0.138 g $Bi_2O_3$[Alfa Aesar, Bismuth(III) Oxide 99.9% (FW=465.96 g/mol)] was dissolved in 5 mL of 7.5 M HCl [37% hydrochloric acid, EMD OmniTrace; 3.1 mL Conc. HCl_1.9 ml DI water)] to form a $BiCl_3$ solution, which serves as the Bi source of the synthesis. 0.5 g $SnCl_2.H_2O$ [Alfa Aesar, tin(II) chloride dehydrate 98% (FW=225.63 g/mol)] was dissolved in 15 mL of 7.5 M HCl (9.3 mL concentrated HCl+5.7 mL Di water). When the $SnCl2.H_2O$ was completely dissolved (may require ~2 hrs), the SnCl$_2$ solution was transferred to a 50 mL round bottom flask. Nitrogen [Purity Plus, 99.999% N$_2$] was bubbled through the solution for 10-15 minutes to remove air. The solution was heated with a reflux of 5° C. cooling water to condense the vapor. The apparatus was purged with nitrogen. After boiling for 10 minutes, 5 mL of the BiCl$_3$ solution was added into the reactor and heated for 1 hour. After heating for this first hour, 10 ml of the PtCl$_4$ solution was added into the reaction flask. The solution turned dark immediately. The solution was heated for another 1 hour. After this hour, the heat was turned off. When the temperature cooled, the flask was moved away from the reflux and a stopper was used to seal the flask. The fact that alloy synthesis is possible under such a highly acidic, chloride containing environment is consistent with previous observations that Bi in contact with Pt is known to be more stable under oxidative environments than pure Bi in the absence of an applied potential Electrode fabrication requires that fine nanoparticle electrocatalysts be supported on carbon to maintain dispersion and maximize the exposed nanoparticle surface area. The PtBi$_2$/C ink used for electrode fabrication is made similarly to the Pt/C ink described in our previous work (S. St. John, I. Dutta, and A. P. Angelopoulos, "Synthesis and Characterization of Electrocatalytically Active Platinum Atom Clusters and Monodisperse Single Crystals", *J. Phys. Chem. C* 114 (2010) 13515-13525, which is incorporated by reference in its entirety). Two stages were used. The first stage employed a layer of cationic polyacrylamide to adsorb PtBi$_2$ nanoparticles onto the surface of Vulcan-XC72 (Cabot Corporation, USA) carbon support, forming PtBi2/C. The second stage involved suspension of the PtBi$_2$/C into a 50% isopropanol (IPA)-water solution containing Nafion® to make the ink in a manner similar to a method described by Gasteiger et al. (Gasteiger, H. A.; Kocha, S. S.; Sompalli, B.; Wagner, F. T., "Activity benchmarks and requirements for Pt, Pt-alloy, and non-Pt oxygen reduction catalysts for PEMFCs." App. Cat. B 2005, 56 (1-2), 9-35, which is incorporated by reference in its entirety). For the first stage, 1.279 g/L of carbon support powder was dispersed in a 50-50 IPA-water solution in a sonicator. 0.6 g/L of cationic polyacrylamide in DI water was prepared. In a centrifuge tube, 1 ml of the carbon suspension was mixed with 1 ml of the polyelectrolyte suspension, 4 ml of IPA, and 4 ml of 0.2 M H$_2$SO$_4$. This mixture was sonicated for 10 minutes, the supernatant discarded, and the mixture was washed three times with water to thoroughly rinse away any unattached polyelectrolyte. After the final supernatant rinse was discarded, 5 ml of 50-50 IPA-water and 5 ml of the prepared PtBi2 suspension was added. The mixture was sonicated, centrifuged at 4000 rpm for 30 minutes, and the supernatant again discarded. 5 ml of 50-50 IPA-water and 5 ml 0.1 M NaOH were then added and the mixture sonicated and again centrifuged for 30 minutes. The supernatant was discarded and 10 ml of 50-50 IPA-water added. The mixture was sonicated for 5 minutes until the particles were dispersed in the solution. A Büchner funnel was used to filter off the supernatant. The particles left on the filter paper were triple rinsed with 20 mL DI water. The powder was dried in an oven at 110° C. in air. The weight of the powder was measured and elemental analysis was performed to determine the mass of Pt in each electrode. In the second stage of the electrode ink fabrication process, 10-20 mg the powder (depending on Pt loading desired) was dispersed in 3 mL of 1 g/L Nafion dissolved in 50-50 IPA-water solution. The Nafion® source was a 5 wt % solution (Fuel Cell Store). A loading of 0.2-0.4 g$_p$t/cm$^2$ was targeted.

1.1.2 Metallic Bi Precursor Process

The stannous chloride phase diagram prepared by Cohen (hereby incorporated by reference in its entirety) indicates that both pH and [Cl$^-$] will influence the stability of Pd nanoparticles obtained utilizing an autocatalyic redox synthesis procedure similar to that used in this study. At the same time, phase diagrams prepared by Kirby (Kirby, H. W.; Nelson, G.; Payne, J., Reduction of Bismuth Chloride by Stannous Chloride. Ind. Eng. Chem. 1956, 48 (10), 1949-1950, hereby incorporated by reference in its entirety) indicate that reduction Bi metal by stannous chloride is also strongly influenced by [Cl$^-$]. To determine the synthesis conditions most favorable for Bi metal nanoparticle formation, a series of experiments were performed to independently vary pH and [Cl$^-$] using the indicated phase diagrams as guides. Synthesis requires that the stannous chloride complex adsorbed onto the growing nanoparticle surface possess a negative charge to stabilize the NP suspension through electrostatic repulsion. The pH must therefore be as low as possible and the [Cl$^-$] as high as possible. While Bi metal is relatively noble in that it can withstand a wide range of pH, it becomes readily oxidized in the presence of high Cl$^-$ concentrations. In the experiments, pH was varied from 1 to 4 using HCl and the total Cl$^-$ concentration was adjusted using NaCl. We determined that a 0.001 M HCl solution was optimum for synthesis.

To synthesize the nanoparticles, 0.4659 g of Bi$_2$O$_3$ powder and 1.3538 g of SnCl$_2$.2H$_2$O were weighed and transferred into a 15 ml vial. 10 ml of 0.001 M HCl was prepared and added into the vial. The vial was sealed and the solution stirred at 400 rpm with a stir bar for 3 days. The color of the solution changed from light yellow, to orange, to dark green, and to black at the end of the reaction.

The metallic bismuth nanoparticles (more particularly Bi nanoplatelets) formed were then used as precursors for alloy synthesis. 1 g of PtCl$_4$ was dissolved in 100 ml of 7.5 M HCl (62 ml concentrated HCl+38 mL DI water). This is the Pt source for this synthesis route. 0.318 g of SnCl$_2$.2H$_2$O was dissolved in 5 ml of 7.5 M HCl (3.1 mL concentrated HCl+1.9 mL DI water) in a 15 ml vial. The SnCl$_2$.2H$_2$O was completely dissolved (may take ~2 hours). Nitrogen bubbling was used to eliminate the oxygen in the solution for 10-15 minutes. The SnCl$_2$ solution was then heated to boiling on a heating plate with a well-sealed cap. A mixture of 1 ml of the Bi nanoplatelets precursor (Sn/Bi=3/1) and 5 ml of the pre-dissolved PtCl$_4$ solution was then immediately transferred into the vial while stirring at 400 rpm with a stir bar. The solution turned dark immediately. The molar ratio of Sn/Pt is 9/1. The vial was again sealed tight with a cap to minimize exposure to air and heated for 1 hour. The resultant PtBi$_2$ nanoplatelets were too large and the suspension not sufficiently stable to take advantage of electrostatic assembly on carbon. Consequently, these nanoplatelets were used in unsupported form and labeled as PtBi$_2$—N. Electrode ink formation utilizing these nanoplatelets proceeded as follows.

The PtBi$_2$ nanoplatelets were transferred from the reactor flask to a centrifuge tube then centrifuged at 4000 rpm for 30 min. After centrifuging, the supernatant was discarded and 10 mL of DI water was added. The sample was shaken vigorously and sonicated for 5 min, and centrifuged for 30 minutes. This step was repeated 2 more times for a total of 3 DI water rinses. After discarding the supernatant of the last DI water rinse, 5 mL of 50% IPA and 5 mL of 0.1 M NaOH solution were added. The sample was sonicated for 30 minutes, after which the particles were again allowed to settle to the bottom of the centrifuge tube. 10 mL of 50% IPA was added after the centrifuging and then sonicated for 5 minutes until the particles were dispersed in the solution. A Büchner funnel was used to filter off the supernatant. The particles left on the filter paper were triple rinsed with 20 mL DI water. The entire filter paper and the particles were dried in an oven at 110° C. in air for 10 minutes. The particles along with the filter paper were then transferred into a small vial and 3 mL of 1 g/L Nafion dissolved in 50% IPA was added. The sample was sonicated to completely disperse the $PtBi_2$ particles and the empty filter paper was discarded. Weighing and elemental analysis were used to determine the final Pt loading on the electrode.

1.2 Pure Pt/C Catalyst Preparation

Pure Pt nanoparticles supported on high-surface-area carbon as a catalyst was used as a control group. The work was described in our previous publications (hereby incorporated by reference in its entirety). In brief, $PtCl_4$ in a solution of 7.5 M HCl was mixed with $SnCl_2.2H_2O$ dissolved in 7.5 M HCl solution under $N_2$ atmosphere while being heated at 110 C for an hour. The ratio of Sn/Pt in solution was 3:1. The approach yields very uniform and well dispersed Pt nanoparticles of approx. 2.5 nm in size suspended in 7.5 M HCl solution. The native negative charge on the Pt nanoparticles is then used to support the Pt nanoparticles onto Vulcan carbon using an LbL assembly scheme previously described. The final Pt/C was suspended into 50/50 $IPA/H_2O$ with certain amount of 5% Nafion solution as an electrode ink.

1.3 Electrochemical Measurements

Electrochemical measurements were conducted on both PtBi—C ink and PtBi alloy ink on glassy-carbon (GC) disk electrodes (0.196 $cm^2$). Sweep voltammetry in a nitrogen-saturated, 0.5 M sulfuric acid electrolyte was used to determine the active surface area by proton adsorption/desorption for electrodes in a standard three-electrode electrochemical cell with a Ag/AgCl reference electrode and platinum-wire counter electrode at room temperature. The GC electrode assembly, rotator, potentiostat, and software were purchased from Pine Instruments.

10 μL of the ink was pipetted onto the GC surface and dried in air at a rotating rate of 400 RPM for 15 minutes. A uniform electrode film was formed on the GC. The electrode was then wetted with DI water and a drop of water was left on the surface to prevent air bubbles when being lowered into the electrolyte. The electrode was carefully observed and no material was observed to come off the electrode. The electrode appeared intact upon visual inspection following electrochemical surface area measurement (ECSA) as well as oxygen reduction reaction (ORR), ethanol oxidation reaction (EOR) and DME mass activity measurements.

The electrode was swept positively at 250 mV/s until a stable signal was obtained in $N_2$-saturated, 0.5 M sulfuric acid from 0.05-1.25 V vs the reversible hydrogen electrode (RHE). In addition, approximately 10 cycles were made to higher potentials to guarantee the removal of any adsorbed $SnCl_2$. During activity assessment, the hydrogen adsorption/desorption signal grew, as tin and Bi were electrochemically removed from the surface. Typically, 200 cycles were conducted to obtain a stable signal. Although wet-chemical removal of surface Sn is feasible for commercial application, electrochemical removal is more convenient in our present fundamental study. However, it should be understood that wet-chemical removal can be employed.

Electrochemical surface area (ECSA) values were calculated by integrating the area of adsorbed hydrogen oxidation in the polarization curves obtained during anodic potential seeps in nitrogen-saturated 0.5 M sulfuric acid and then dividing the result by the scan rate to give total charge involved in proton removal. This underpotential deposition (UPD) region lies between 50 mV and 400 mV vs RHE (anodic currents in this study are positive). Division of the total charge by an average Pt charge distribution (210 $\mu C/cm^2$), with the assumption that 1 electron is used to adsorb 1 proton per Pt atom, yields the ECSA. We used the industry standard average charge distribution to remain consistent with the results obtained by other groups. The results are readily corrected to account for differing distribution of face atoms at different particle sizes and compositions.

A new electrode was prepared on the glassy-carbon to perform DME electro-oxidation. After ECSA measurement, the electrolyte was replaced with DME-saturated, 0.5 M sulfuric acid. The potential was swept from 0.05-1.25 V vs RHE. A total of 2 complete scans were performed.

Following the DME electro-oxidation measurement, the potential was held at 0.8 V vs RHE to perform a chronoamperometry measurement for 2 hours in the same electrolyte.

Electrochemical stripping of Bi and Ge adatoms was used to assist with the deconvolution of the hydrogen adsorption current to determine the surface Pt atom coordination. The electrode was made by dropping 10 μl of the ink onto the glassy carbon disk electrode. The electrode was dried and then dipped into 0.5 M $H_2SO_4$ electrolyte. Sn and Bi were removed by sweeping the potentials from −0.27 v to 1.2 V vs Ag/AgCl until a stable signal was achieved. The electrode was taken out from the electrolyte, and Bi was adsorbed on the electrode from a saturated bismuth(III) oxide solution in 0.5 M sulfuric acid. In separate experiments, Ge is adsorbed on the electrode from a saturated germanium(II) oxide solution in 0.1 M sodium hydroxide. Bi and Ge stripping during CV sweeps isolate the Pt (111) and Pt(100) contributions to the total electrochemical surface area, respectively. Deconvolution of the entire hydrogen adsorption region provide the contribution of the remaining Pt facets.

1.4 SEM/EDS Analyses

Particles were analyzed by EDS (EDAX Corp.) in a FE-SEM (FEI XL-30 System) at the University of Cincinnati Materials Characterization Laboratory. Pt nanoparticle assemblies in aluminum pans were analyzed. EDS on the pan control sample exhibited a nearly 100% aluminum background signal having very low interference with Pt, Bi, and Sn peak positions. The catalysts, before mixing with Nafion, were deposited onto aluminum pans and attached by conductive carbon tape to a sample stage. Since the scattering volume penetrates a few micrometers, the entire thickness of the electrode was analyzed. Standardless quantitative analysis was performed at a constant accelerating potential of 15 kV, a working distance of 10 mm, an amp time of 51.2 μs (to maintain an optimum dead time of 30%), and a magnification of 200×. The C K-emission intensity was compared to the Pt M-, Bi L- and Sn L-emission intensity for relative analysis on aluminum holder for loading determination. At least three measurements per sample were taken. With the information about the total weight of the powder, volume of the ink, volume of each electrode added onto the GC, and the weight percentage of the Pt, the mass for each electrode was obtained.

1.5 X-Ray Diffraction

X-ray diffraction was used to characterize the particle size of the nanoparticle samples. Samples of both types of catalyst for XRD were prepared by packing approximately 1 g of dry, powdered material into an aluminum holder of approximately 1 $cm^2$ and 4 mm thick. Scattering measurements were taken on a PW3040 X'Pert XRD station (Phillips) at the University of Cincinnati Materials Characterization Laboratory with a wavelength of 1.54 (CuKα). The 2θ range was 30-90°. Step sizes of 0.2° were used with an exposure time of 10 s at each step. XRD peaks were analyzed using the well-known Scherrer equation to determine volume averaged particle size. Contributions from the particle strain were neglected when determining the volume-averaged particle size here.

1.6 HAADF-STEM

Samples for transmission electron microscopy (TEM) were prepared by putting a drop of the final solution on a holey carbon grid and dried in air. High-resolution high-angle annular dark-field scanning transmission electron microscopy (HAADF STEM) images were obtained by a spherical aberration ($C_s$)-corrected JEM2100F TEM/STEM operated at 200 kV. Fast Fourier transform (FFT) analyses of the lattice fringes were done using Gatan Digital Micrograph software.

Example 2

Results and Discussion 2.1 Co-Reduction Process

Nanoparticle synthesis begins when the solution of $BiCl_3$ in 7.5 M HCl is mixed with the heated solution of $SnCl_2$ in 7.5 M HCl. The temperature drops down immediately to ~75° C. and then climbs back to ~110° C. The mixture of the solution has no color changes and remains transparent and clear before the solution of $PtCl_4$ in 7.5 M HCl is added. The color turns dark red and brown as soon as the $PtCl_4$ solution is added. After a few minutes, the color of the solution is so dark that no color changes can be observed. Subsequent data demonstrates Pt—Bi alloy formation in highly dispersed nanoparticle form. We have previously reported application of the method to the synthesis of pure Pt nanoparticles and it is here extended to Bi. Such an extension is not obvious since the non-specific adsorption and complexation of tin ligands on Bi for both reduction and particle stabilization during nanoparticle growth was not previously known. To our knowledge, auto-reducible complex formation between Sn and Bi has not been previously reported. Furthermore, stoichiometries to form complete stabilizing shells for particle size distribution narrowing and whether such shells could even be established on Bi was not known. On the other hand, more well-known properties of Bi which prompted us to pursue this approach in the first place are that it has a reduction potential is compatible with the use of tin and that the reduced form of Bi is stable under the acidic synthesis conditions required to maintain a negatively charged tin chloride stabilizing shell. The instantly disclosed method involves mixing of stannous chloride with bismuth chloride (or alternatively, bismuth oxide) in hydrochloric acid. $SnCl_2$ is used as a simultaneous surfactant and reducing agent. Bi is known to be unstable in the high salt, low pH environment required for $SnCl_3^-$ surfactant formation and therefore, this colloidal synthesis route is unexpected. Consequently, the successes with Bi—Pt NP synthesis using this unique inorganic ligand approach are very surprising.

Bi reduction proceeds according to: $2BiCl_4^- + 3Sn^{2+} = 2Bi^0 + 3Sn^{4+} + 8Cl^-$. The chloride concentration has been previously observed to significantly impact reduction kinetics and shift solution equilibrium and this was attributed to changes in the nature of the bismuth complex. For example, precipitate formation in the presence of $SnCl_2$ under alkaline conditions is typically used as a confirmatory wet-chemical test for Bi. However, the structural evolution of the complex or the reductant particles were not examined in this early study. In our experiments, we observed that spontaneous nanoparticle growth occurred with heating in the presence of Pt. Based on our own work with pure Pt, nanoparticle growth likely proceeds via primary particle generation some of which serve as nuclei for LaMer-type diffusion of the primary particles causing NP growth. Non-specific ligand attachment permits the structural re-alignments necessary to allow ligand surface segregation.

2.2 Metallic Bi Precursor Process

As shown in FIG. 1, the mixed powder of $Bi_2O_3$ and $SnCl_2.2H_2O$ has a white/yellow color before the addition of 0.001 M HCl. After addition of the acid and while being stirred under room temperature, the color changed from light yellow to orange. After a few minutes, the entire solution turns to gray. At the end of the reaction, the color becomes dark. When exposed to the atmosphere for even a few minutes, these nanoparticles will become white, indicating a return to their oxidized state.

Alloy nanoparticle formation begins when the mixture of the solution of pre-made Bi nanoparticles and a solution of $PtCl_4$ in 7.5 M HCl is added into a solution of $SnCl_2$ in 7.5 M HCl being heated at ~110 Celsius degrees. Since the color of the mixture is mainly the color of the pre-made Bi nanoparticles, which is dark gray, the color change of the reaction cannot be easily observed. However, unlike the pure Bi nanoparticles, the alloy nanoparticles do not change color when exposed to the atmosphere.

2.3 Microscopy and EDS Mapping of Nanoparticles Prior to Dealloying

Figure 2A:
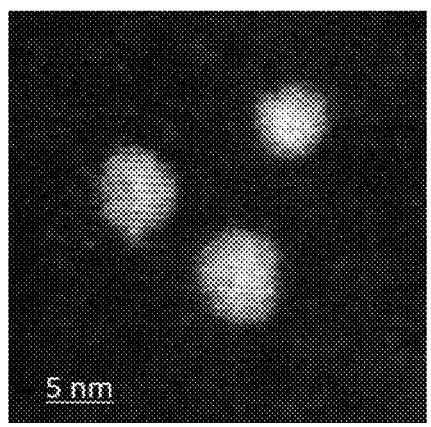
FIG. 2A-C shows HAADF STEM images of $SnCl_3^-$ stabilized NP.
Figure 2B:
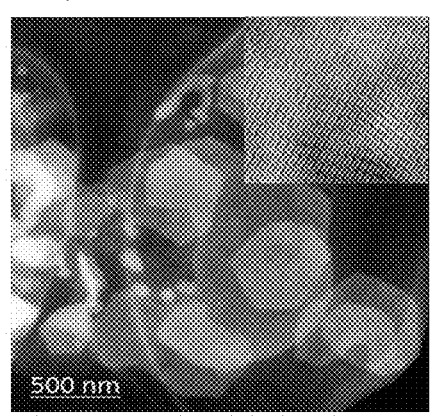
Figure 2C:
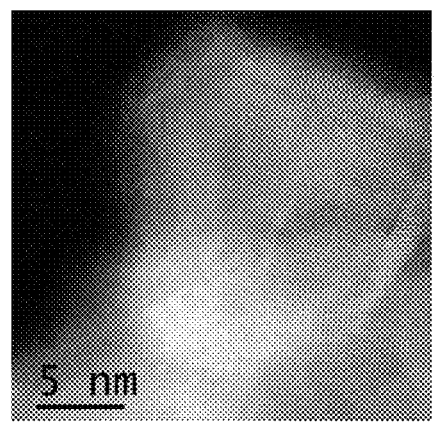
Figure 12:
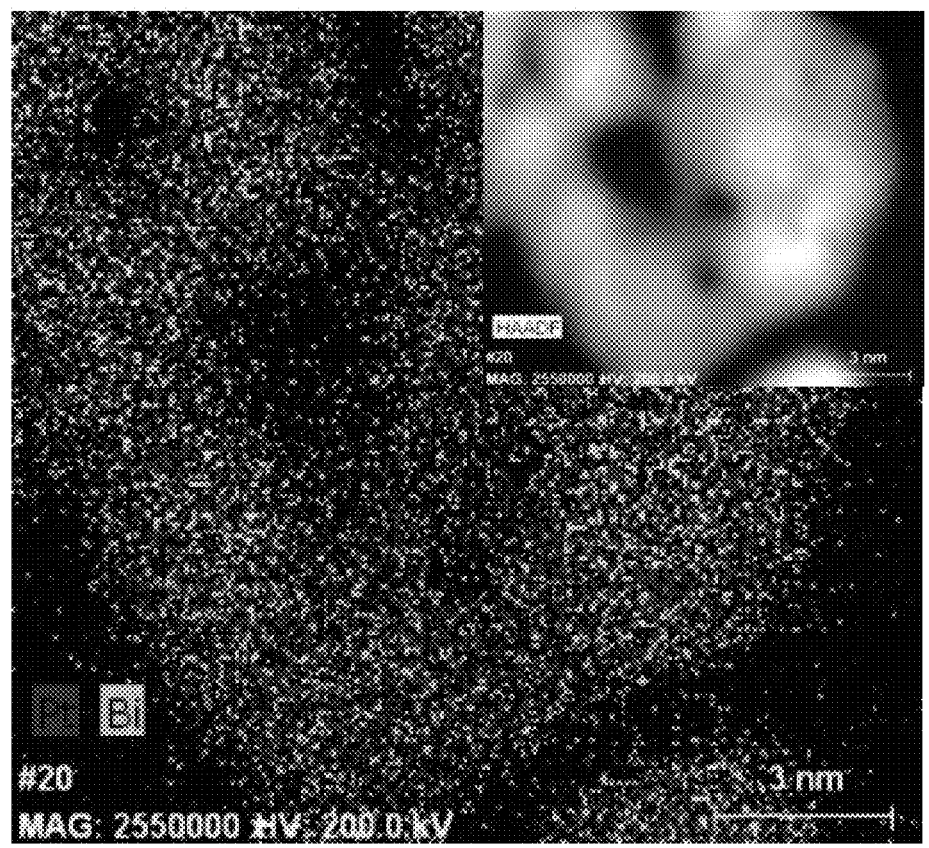
FIG. 12 shows the mapping information of $PtBi_2$ alloy nanoparticles having spherical morphology.

HAADF-STEM images of the nanoparticles synthesized during this investigation are shown in FIG. 2A-C. Alloy nanoparticles synthesized via the co-reduction process, but prior to supporting on carbon and dealloying, are shown in FIG. 2A. FIG. 2A shows that the co-reduction synthesis process yields highly uniform and well-dispersed spherical nanoparticles of approximately 5 nm in size. The ordered atomic structure present in this image is consistent with the $PtBi_2$ atomic ratio obtained from elemental EDS analysis as well as XRD data, presented in the next section. EDS mapping of these nanoparticles is shown in FIG. 12, and depicts a uniform elemental distribution of Pt and Bi.

FIG. 2B is the HAADF-STEM of metallic Bi nanoparticle precursor in synthesis solution. From the low magnification image shown, the Bi nanoparticles are observed to have a widely varying nanoplatelet morphology and are not well dispersed in the suspension. High magnification imaging exhibits a well-ordered structure consistent with XRD data. EDS mapping indicates uniform Bi distribution throughout the nanoplatelet.

Figure 13A:
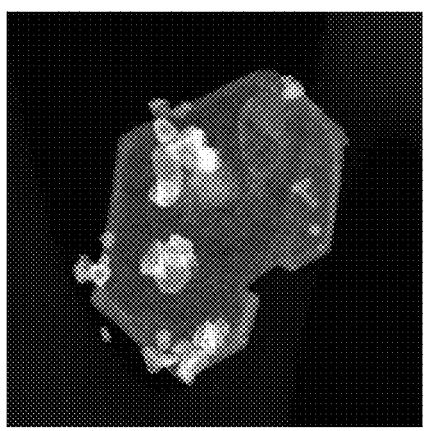
FIG. 13A-C shows the mapping information of PtBi nanoplatelets via the bismuth metal precursor synthesis method.
Figure 13B:
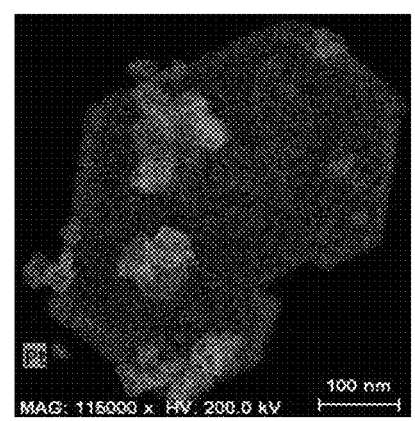
Figure 13C:
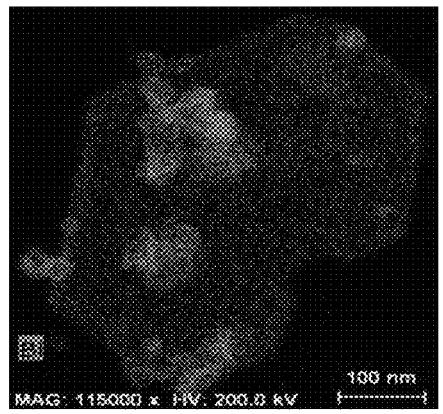

FIG. 2C is the HAADF-STEM image of the $PtBi_2$ alloy nanoparticle synthesized via metallic Bi precursor process. The well-ordered atomic structure is consistent with XRD data shown in FIGS. 6A-C and the atomic ratio of elements. Interestingly, the shape of Bi precursor appears to control the morphology of the final alloy nanoparticle. EDS mapping shown in FIG. 13A-C shows uniform distribution of elements, indicating that a Bi core does not persist subsequent to synthesis.

2.5 Microscopy and EDS Mapping of Nanoparticles after Dealloying

Figure 3:
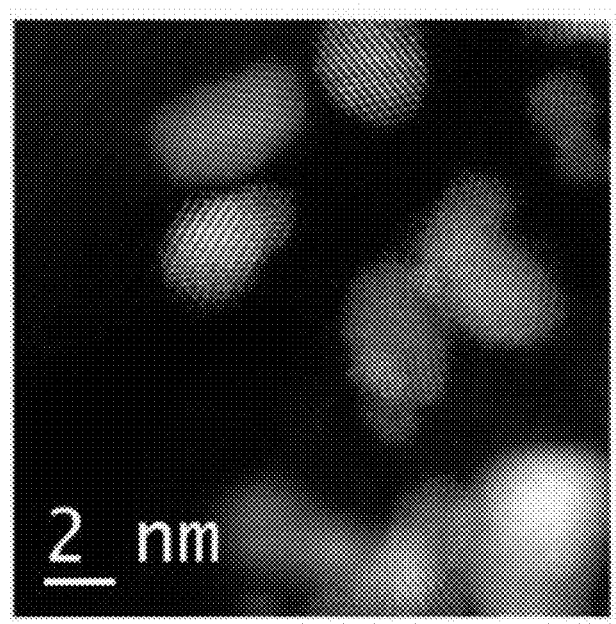
FIG. 3 shows HAADF-STEM imaging of dealloyed $PtBi_2$/C.

HAADF-STEM imaging of the spherical $PtBi_2$ nanoparticles subsequent to supporting on carbon ($PtBi_2/C$) and dealloying is shown in FIG. 3. Dealloying was achieved utilizing a wet chemical procedure so as to better image the dispersed nanoparticles prior to their incorporation into an electrode. After the dry powder of $PtBi_2$—C nanoparticles was collected, it was transferred into 1 M $HNO_3$ solution and kept in a water bath of 60 C for 20 minutes. The particles were collected, washed thoroughly with DI water, and dried prior to imaging. Incorporation of these particles into an ink and fabrication of electrodes as described in the Methods and Materials section yielded electrochemical performance comparable to that of the electrochemically dealloyed electrodes. Such ex-situ wet-chemical dealloying is essential in practical application of the technology to avoid system contamination. From FIG. 3, we note that the nanoparticle structure is little altered by supporting on carbon and dealloying. This finding as regards to the carbon is comparable to findings with Pt/C where electrostatic assembly was used.

Figure 14:
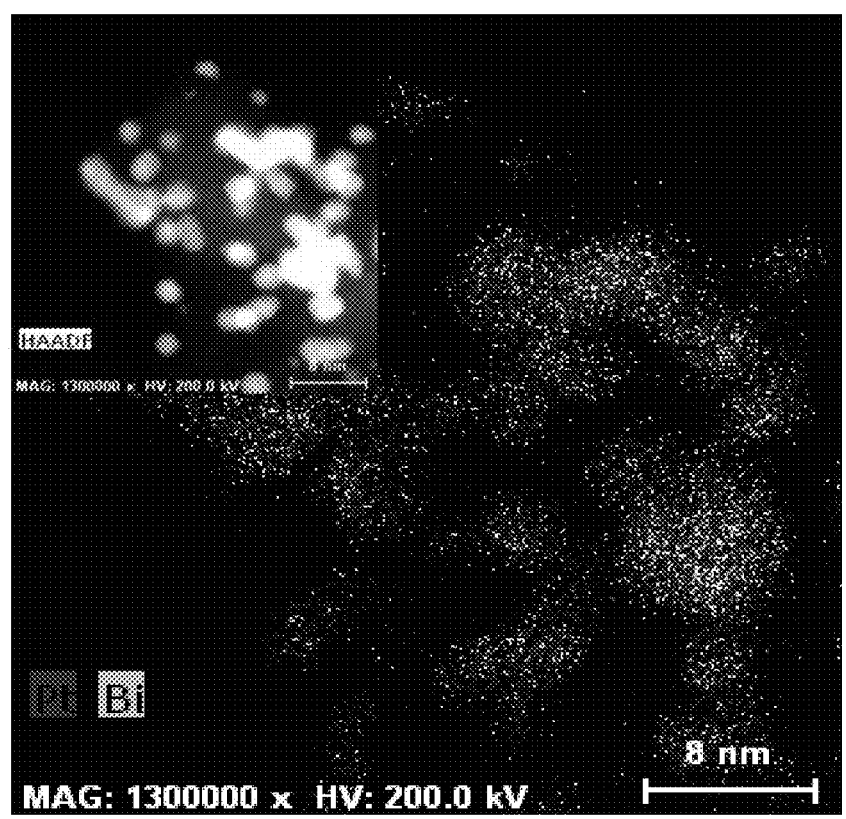
FIG. 14 shows EDS mapping of $PtBi_2$/C, with the inset showing the corresponding HAADF-STEM image.

EDS mapping of the $PtBi_2$/C is shown in FIG. 14. The key difference in this figure relative to the nanoparticles prior to dealloying is the overall loss of Bi intensity relative to Pt. However, this loss is found to occur uniformly across the NP.

Figure 4:
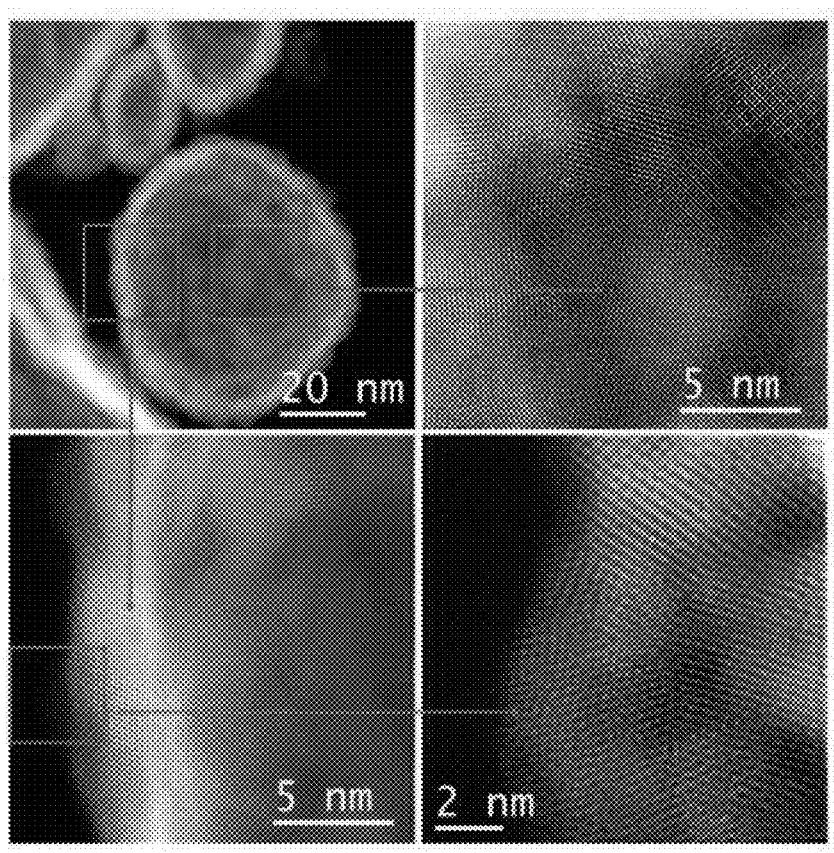
FIG. 4 shows HAADF-STEM imaging of dealloyed $PtBi_2$—N. The smaller squares and arrows indicate successive magnifications on regions of the NP.

HAADF-STEM of the $PtBi_2$ nanoplatelets dealloyed as described above is shown in FIG. 4. FIG. 4 shows successive magnifications of particular areas on a typical nanoparticle. We observe substantial disturbance of the morphology of the nanoplatelet and loss of the sharp edges that were observed in FIG. 2C. Nevertheless, crystalline structure is observed to persist at the higher magnifications.

Figure 5:
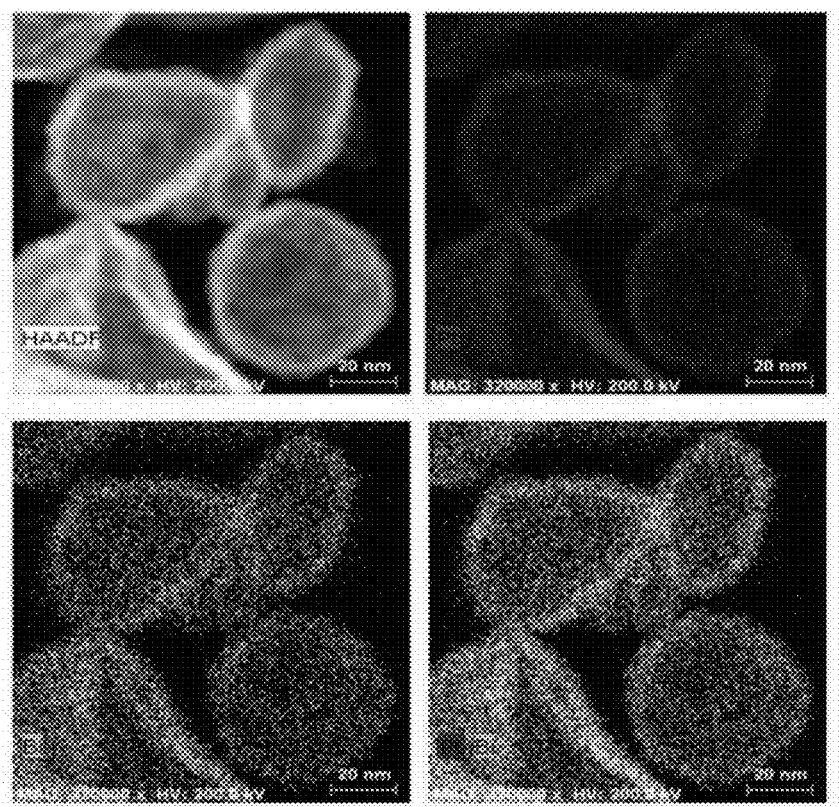
FIG. 5 shows EDS mapping of dealloyed $PtBi_2$—N.

EDS mapping of the dealloyed $PtBi_2$—N is shown in FIG. 5. We note striking enhancement of the Pt content at the topmost surface of the nanoplatelets, in contrast to the overall reduction of Bi intensity in the $PtBi_2$/C shown in FIG. 14. Such behavior is unique to nanoparticle dealloying, where a core-shell morphology typically occurs in smaller nanoparticles.

2.5 Quantitative EDS

EDS data was collected on both supported $PtBi_2$/C and $PtBi_2$—N alloy nanoparticles. The relative loading was determined by comparing the Pt and C weight fractions determined from the K and M lines, respectively. The ratio of Pt and Bi was obtained from the integration of the area under the characteristic peak. The data indicates that the Pt loadings of in the range of 48 wt % and 31 wt % relative to C were typically achieved for $PtBi_2$/C and $PtBi_2$—N alloy electrodes, respectively. The Pt/Bi atomic ratio for both of the NPs was always close to 1/2, and did not change with the initial ratio of Pt/Bi in the synthesis solution. Based on the Bi—Pt phase diagram, under synthesis conditions, $PtBi_2$ is consistent with the most thermodynamically stable alloy composition.

EDS subsequent to chemical de-alloying indicated complete Sn and significant Bi removal from the surface. Electrochemical Bi and Sn removal from the surface was confirmed by monitoring the respective stripping peaks as well be shown in a subsequent section.

2.6 X-Ray Diffraction

Figure 6A:
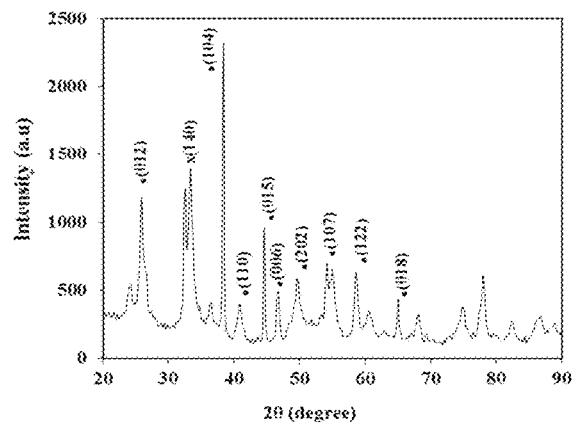
Figure 6B:
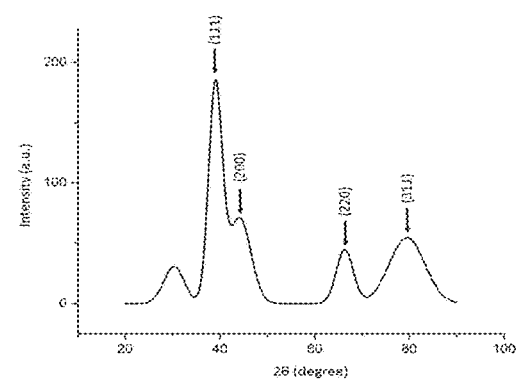
Figure 6B:
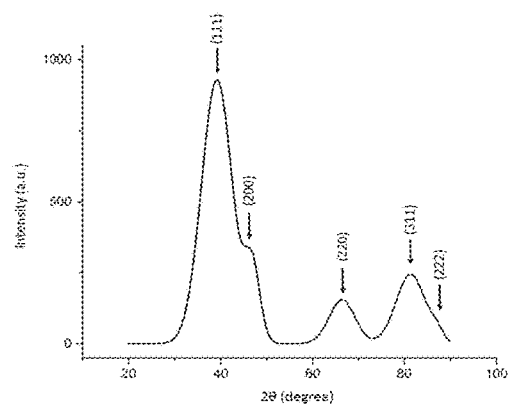

FIG. 6A-C shows the XRD patterns for the three types of nanoparticles synthesized in this investigation. The XRD of pure Bismuth powder was difficult to obtain due relatively rapid oxidation of the nanoparticles when removed from the synthesis solution and exposed to air. The XRD spectrum of the Bi is shown in FIG. 6A. The peaks observed correspond to the crystalline structure of bismuth (as marked) along with a few additional peaks associated with formation of $BiO_x$, which likely occurred during analysis. The XRD pattern exhibits intense peaks which can assigned to the rhombohedral structure of bismuth as shown. These are in good agreement with XRD patterns observed for bismuth nanoparticles in previous studies.

FIG. 6B shows the XRD pattern of the $PtBi_2$—N alloy synthesized using the metallic Bi precursor synthesis method. The XRD spectrum shows a strong scattering peak for the Pt(111) plane and slightly week peaks that can be defined as (200), (220) and (311) crystal planes of Pt. These occur at angles 39.09, 44.17, 66.32 and 79.23 deg., respectively. For the pure Pt fcc crystal system, the peaks fall at 39.73, 46.21, 67.42 and 81.20 deg. The slight differences suggest alloy formation and this is consistent with prior measurements in the literature for $PtBi_2$ alloy. The Bi peaks are obscured in both our measurements as well as in prior investigations. The broad peak observed at ~30 deg. in FIG. 6B has never been observed in platinum crystal structure or metallic bismuth NP structure, and is therefore not assigned here. The particle size calculated based on the Scherrer equation was found to be 6.23 nm. The large particle size distribution of these nanoplatelets observed in the HAADF-STEM images indicates that this size can only be associated with the average size of the asymmetric nanoplatelets. The XRD spectrum for the $PtBi_2$/C nanoparticles synthesized utilizing co-reduction is shown in FIG. 6C. Peak assignments are comparable to those in FIG. 6B with the exception of the broad peak at ~30 deg. Particle size was calculated to be 1.82 nm and is somewhat smaller than the 3-5 nm observed using HAADF-STEM (FIG. 2A).

2.7 Electrochemical Measurements 2.7.1 ECSA Measurement

Figure 7A:
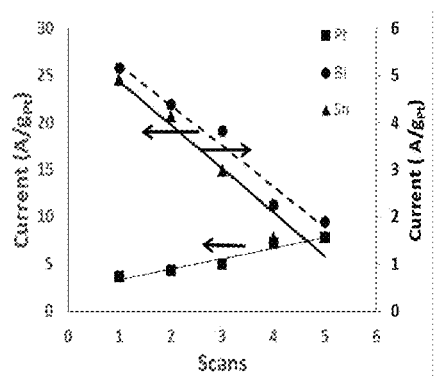
FIG. 7A-C shows peak current evolution at the Sn and Bi stripping potentials of 0.6 and 0.9 V vs. RHE, respectively, as well as H(ads) stripping current on Pt at 0.2 V vs. RHE as a function of the number of potential sweeps.
Figure 7B:
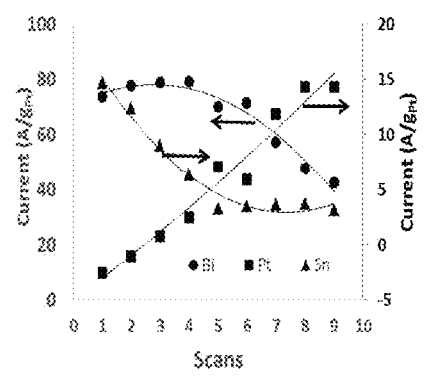
Figure 7C:
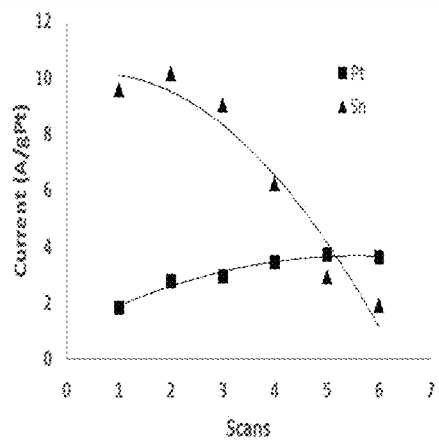
Figure 15:
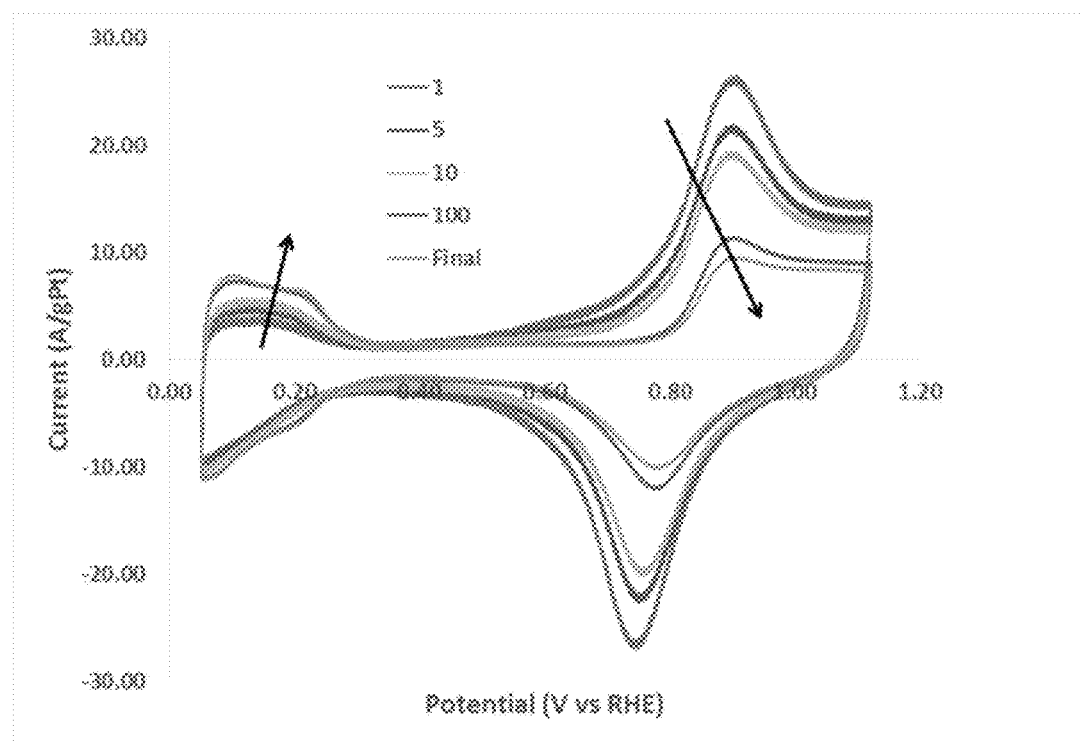
FIG. 15 shows the potential cycling of $PtBi_2$/C at 50 mV/s, with arrows showing the successive decrease in Bi and Sn stripping current and the successive increase in the proton stripping current from Pt.
Figure 16:
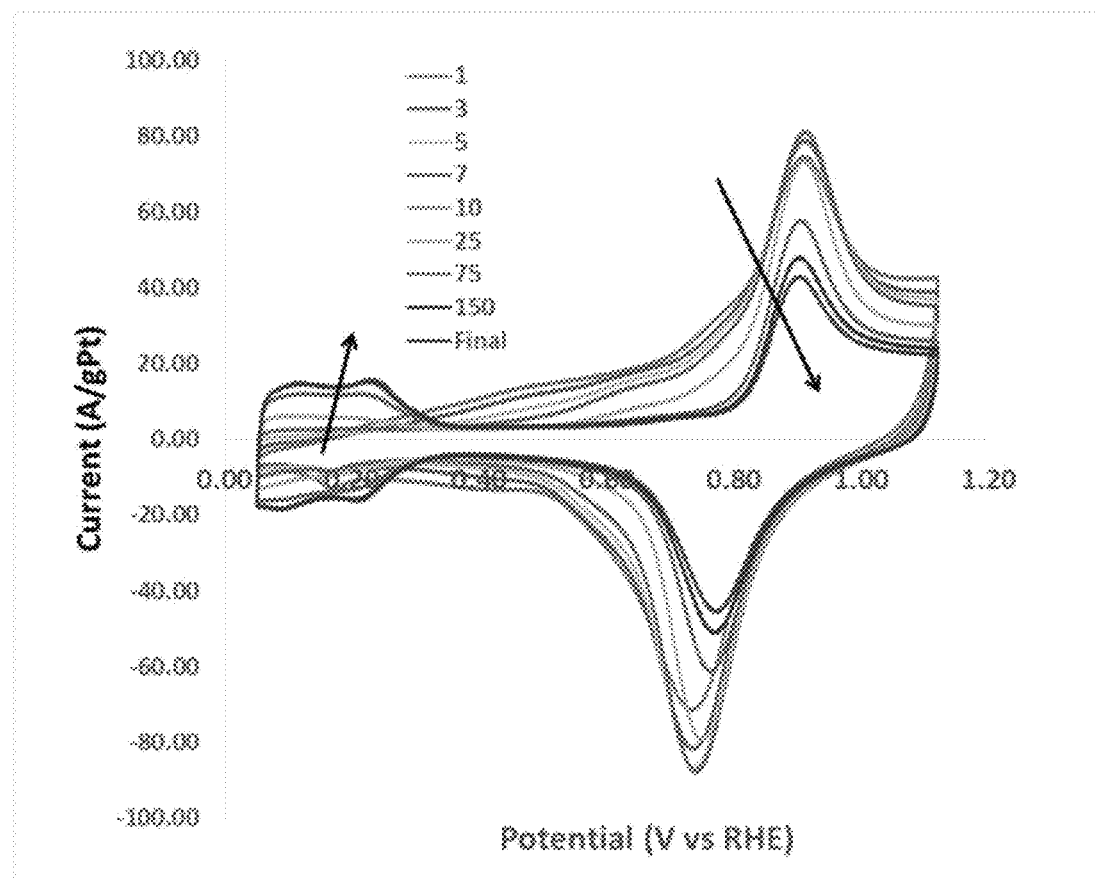
FIG. 16 shows the potential cycling of $PtBi_2$—N at 50 mV/s, with arrows showing the successive decrease in Bi and Sn stripping current and the successive increase in the proton stripping current from Pt.

To remove the $SnCl_3^-$ complexed to the surface of the nanoparticles, the electrodes are swept from 0.05 V to 1.52 V for as many as 200 scans to obtain a stable signal. EDS is used to confirm removal of both species to the resolution level of this technique. FIG. 15 and FIG. 16 depict the evolution of CVs with successive sweeps for the two types of synthesized $PtBi_2$ alloy nanoparticles. Sn is removed in the range of ~0.55 to ~0.7 V vs RHE and overlaps the Bi adatom stripping potential of 0.9 V. FIG. 7A-C depicts the associated decrease in the stripping currents for Sn and Bi at 0.6 V and 0.9 V, respectively, over the first few cycles, as well as the increase in current due to the oxidation of adsorbed hydrogen on Pt, H(ads), at 0.2 V. $PtBi_2$/C shows that both Bi and Sn currents decrease concurrently and rapidly, while the proton stripping current shows a correspondingly rapid increase (FIG. 7A). Such behavior is consistent with the EDS mapping of the dealloyed $PtBi_2$/C (FIG. 14) which shows loss of Bi throughout the nanoparticle volume. $PtBi_2$—N exhibits very different behavior (FIG. 7B). The Bi stripping current remains constant while the Sn current decreases, and the H(ads) stripping current increases. Bi stripping does not begin until the $4^{th}$ or $5^{th}$ cycle at which the surface Sn is almost gone. Such behavior is comparable to Sn stripping from pure Pt/C as shown in FIG. 7C, and indicates that the source of surface Bi remains constant as Pt content increases. Such behavior is consistent with the formation of a Pt-rich shell on top of the $PtBi_2$ alloy core. Eventually, Bi is consumed from subsurface regions and the Bi stripping current drops. Such behavior is entirely consistent EDS mapping of dealloyed $PtBi_2$—N shown in FIG. 5. At these dimensions, the diffusion time scales for spherical and planar geometries are comparable. Consequently, persistence of the Bi stripping current in $PtBi_2$—N relative to $PtBi_2$/C is likely associated with more difficult Bi dissolution from the crystallographic terraces of $PtBi_2$—N, as compared to the edge and other sites of low coordination on the $PtBi_2$/C.

Stripping can be accelerated and in-situ cycling avoided through prior soaking of the electrodes in acidic or alkaline solution as previously described in the art. As observed in FIG. 7A-C, little proton adsorption/desorption can be observed on Pt during the initial scans because the surface is covered by Sn and Bi. With increasing number of cycles, the peaks gradually begin to overlap. ECSA is measured after complete peak stabilization. Interestingly, while the PtBi$_2$—N cycling data suggests the presence of a surface skin of pure Pt, evolution of a much stronger mass-specific signal from proton stripping on the PtBi$_2$—N surface relative to the PtBi$_2$/C or Pt/C surfaces is observed after the onset of Bi stripping.

Figure 8:
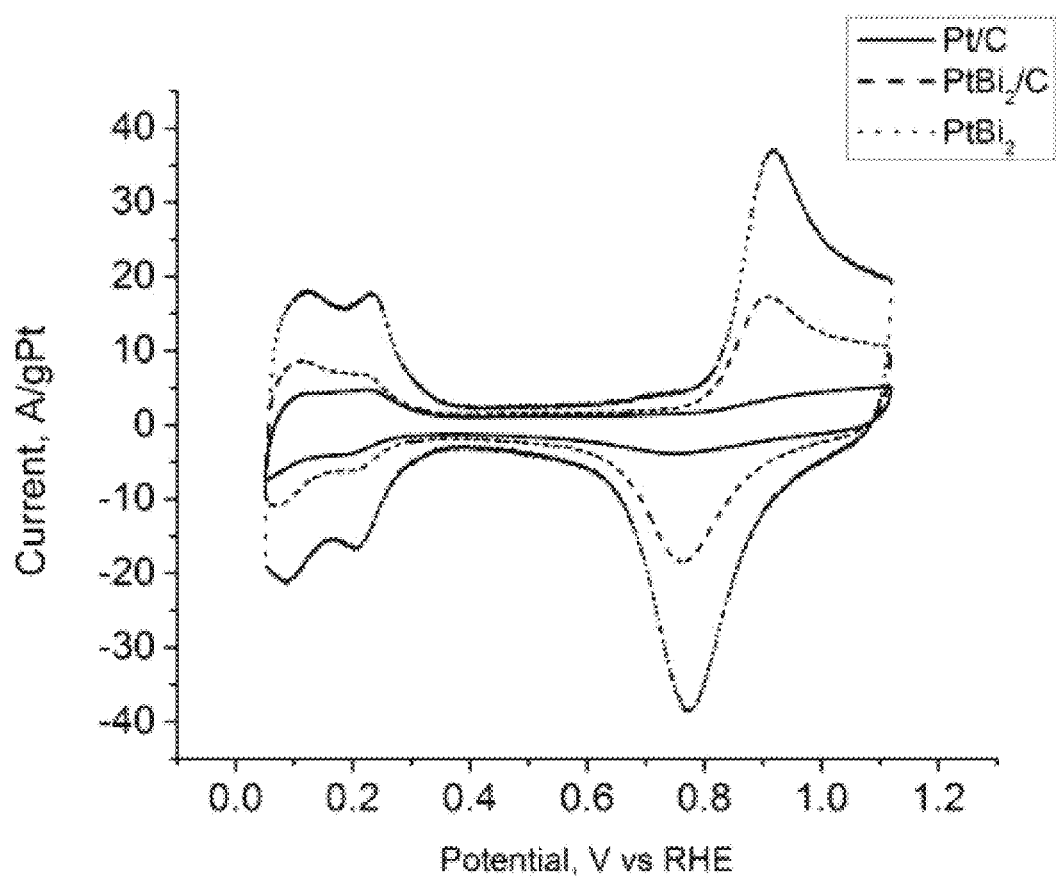
FIG. 8 shows CVs of $PtBi_2$—N(dotted), $PtBi_2$/C (dashed) and Pt/C (solid) in $N_2$-saturated 0.5 M sulfuric acid at room temperature. Scan rate: 50 mV/s. The current is normalized by the mass of Pt metal each electrode contains.

FIG. 8 shows the stabilized cyclic voltammograms (CVs) of the electrodes in 0.5 M sulfuric acid saturated with nitrogen at room temperature. The potential window is from 0.05-1.12V vs RHE and the scan rate is 50 mV/s. The currents are normalized by the mass of Pt each electrode contains.

The CV for Pt has been widely investigated. Peak location ranges for characteristic crystal planes on Pt were limited to +/−10 mV of the literature values presented in Feliu et al (J. Solla-Gullón, P. Rodriguez, E. Herrero, A. Aldaz, J. Feliu, Surface characterization of platinum electrodes, Phys. Chem. Chem. Phys. 10 (2008) 1359-1373, hereby incorporated by reference in its entirety). For pure Pt electrode, the (110) peak appears at the potential of 0.125 V, low index sites appear at 0.17, 0.20, 0.23 and 0.245 V, and the (100) steps and terraces appear at 0.26 and 0.28 V, respectively. The electrode was swept by a linear potential signal. During the negative scan from 0.42 to 0.05 V vs RHE, the proton in the sulfuric acid is adsorbed onto the active sites of the Pt surface. Then the proton desorption occurs from 0.05 to 0.4 V vs RHE during the positive scan. This proton desorption regime can be used to calculate the ECSA of the catalyst. At the higher potential of the positive scan, Pt—OH species are formed at ~0.9 V vs RHE; and then this species are converted into Pt—O species. During the negative scan, this Pt—O species are reduced at ~0.79 V vs RHE.

The shape of the CVs for the three types of nanoparticle electrodes are very different. Deconvolution of the hydrogen adsorption/desorption region will give a quantitative assessment of the surface structure of each catalyst. Such deconvolution was aided utilizing Feliu's adatom analysis. In the proton desorption range, a substantial difference between de-alloyed PtBi$_2$/C and Pt/C can be observed in that the latter shows a higher portion of (110) facets at ~0.125 V vs RHE compared to the entire proton desorption active site. This difference is also noted in the case of the PtBi$_2$—N relative to Pt/C. Compared to Pt/C, PtBi$_2$—N is also observed to have a lower (110) facet fraction in the hydrogen desorption region. Such behavior contrasts sharply with the Pt/C nanoparticle electrode for which the 110 site is dominant at ~0.125 V.

For the PtBi$_2$—N electrode, in place of the 110 peaks, peaks of 100 sites appear at ~0.26 and ~0.28 V. For the PtBi$_2$/C spherical nanoparticle electrode, neither the 110 nor 100 sites are present to any significant degree. Table 1 summarizes the deconvolution result of the hydrogen adsorption/desorption region of each catalyst. The contribution of Pt(111) was found to be negligible in all cases at less than 1% of the surface, consistent with our previous investigations. Additionally, Table 1 includes the corresponding ECSA measurements. The greater than order of magnitude increase in the ECSA of the dealloyed PtBi$_2$ nanoplatelets relative to Pt/C is unprecedented in the field.

TABLE 1

ECSA data and the percentage of different active Pt sites for each catalyst type.

| Catalyst | ECSA (m$^2$/gPt) | (110)% | (100)% | Lower index sites % |
|---|---|---|---|---|
| PtBi$_2$—N | 550.80 | 3.6 | 37.4 | 59.0 |
| PtBi$_2$/C | 85.43 | 3.3 | 2.5 | 94.2 |
| Pt/C | 32.00 | 36.9 | 11.8 | 51.3 |

The de-alloyed PtBi$_2$—N exhibits substantial enhancement of the Pt(100) surface fraction relative to pure Pt/C or the spherical de-alloyed PtBi$_2$/C. When compared to previous theoretical work and single crystal studies on Pt, and neglecting the effect of any residual Bi on activity, the unsupported dealloyed PtBi$_2$—N would be predicted to yield substantially improved specific DME electrooxidation activity relative to pure Pt due to the prevalence of the 100 sites relative to 110 sites. The spherical PtBi$_2$/C nanoparticles appear to be an intermediate case, with both Pt(110) and Pt(100) being substantially reduced. Previous work does not provide insight as to how the resultant lower index sites contribute to DME electro-oxidation on Pt.

2.7.2 DME Electro-Oxidation in Sulfuric Acid

Figure 9A:
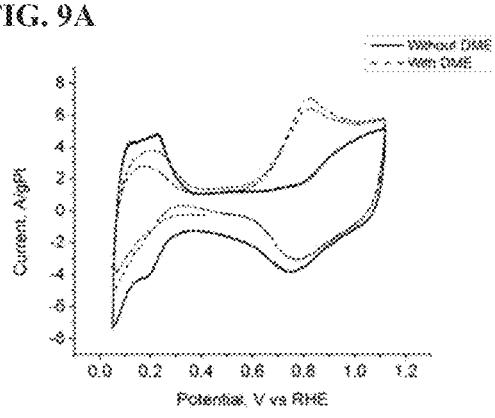
FIG. 9A-C shows the comparison of CVs in electrolytes with DMC (dashed) and without DME (solid).
Figure 9B:
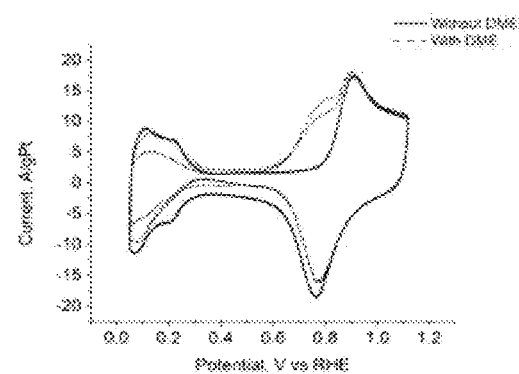
Figure 9C:
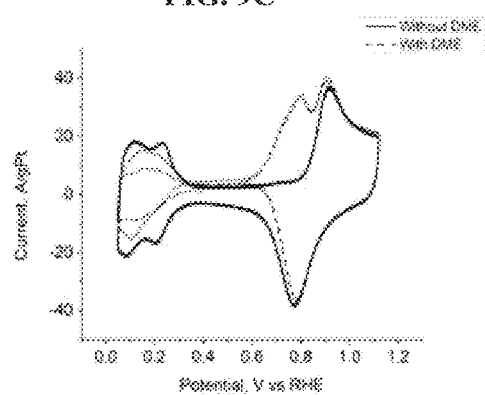

We compared the CVs of each electrode (Pt/C, PtBi$_2$/C and PtBi$_2$—N) with and without DME in the electrolyte after dealloying and ECSA measurement. The mass-normalized results are shown in FIG. 9A-C. Two continuous scans were performed as soon as the electrode was immersed into the electrolyte. During the first scan, the potential swept in the negative direction beginning at a potential of 0.52 V vs. RHE. Some general trends are observed for all electrodes. The peaks under the potential windows of 0.05-0.4 V vs RHE correspond to proton adsorption and desorption during anodic and cathodic scan. As shown in FIG. 9A-C, these are significantly suppressed for all electrodes due to the DME molecules and oxidation intermediates, i.e. CO$_{ads}$, that occupy the active sites. No obvious peaks are observed in the positive going scan up to 0.6 V. At ~0.74 V and 0.8 V, a shoulder and a sharp peak appear, which are related to the oxidation of adsorbed intermediates and adsorbed DME molecules. After that, Pt—O species are formed covering the active surface of Pt. These Pt—O species are gradually reduced at ~0.8 V during the cathodic scan. More active sites of Pt surface are exposed to DME molecules with Pt reduction. At ~0.6 V and ~0.4 V, two mild oxidation peaks of DME are observed and are associated with the oxidation of additional adsorbed DME intermediates.

For all electrodes, there is an increase in the ECSA with the second scan. This behavior suggests that the initial cathodic sweep removes adventitious carbon formed during transfer of electrode the sulfuric acid electrolyte used in the ECSA measurements to the DME solution.

Figure 10:
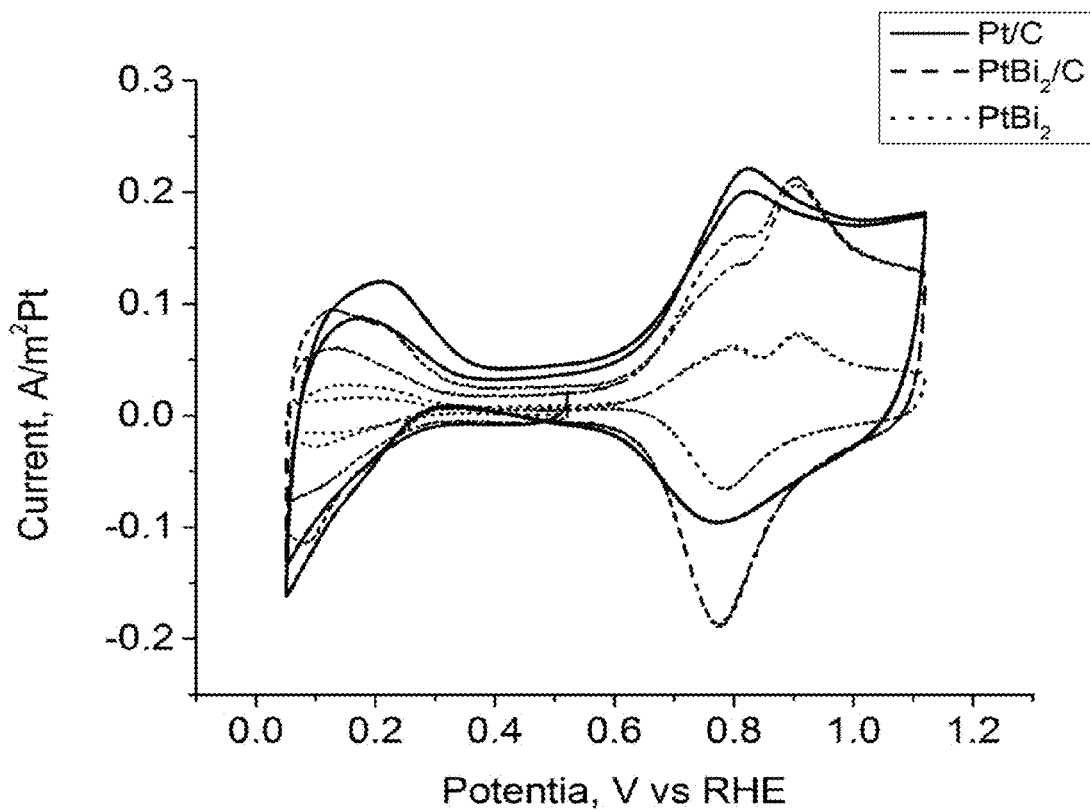
FIG. 10 shows CVs of the $PtBi_2$—N(dotted), $PtBi_2$/C (dashed) and Pt/C (solid) in DME-saturated 0.5 M sulfuric acid at room temperature. Scan rate: 50 mV/s. Currents are normalized by the ECSA of each electrode.

However, the Pt/C ECSA does not recover to its pristine state. On the other hand, PtBi$_2$/C exhibits better recovery during the anodic scan than Pt/C. As shown in FIG. 9B, the second scan shows an electrochemically active area almost same as the background. With self-supported PtBi$_2$—N catalyst, the recovery ability is better than Pt/C but weaker than PtBi$_2$/C. The corresponding area-normalized data for DME oxidation is shown in FIG. 10. Despite the apparent lower surface poisoning effects of the alloys, activity per Pt site is lower.

The maximum mass-normalized peak current of DME oxidation at 0.8 V on pure Pt is substantially lower than that on PtBi$_2$—N and PtBi$_2$/C catalysts. However, as shown in FIG. 10, when normalized with respect to Pt ECSA, the activity of pure Pt is highest while that of self-supported PtBi$_2$—N is lowest. Such behavior indicates that the gain in mass activity observed with the Bi alloys is due to enhanced surface area and that the activity per site is actually lower. These results are included in Table 2.

In Table 2, the mass-speak peak anodic current at 0.8 V has been normalized by the mass of Pt that each electrode contains. The peak current densities and associated mass activities decrease in the order of PtBi$_2$—N>PtBi$_2$/C>Pt/C, while the specific activities followed the opposite trend. This observation strongly suggests that mass activity is driven primarily by surface area rather than surface atom coordination in this system. When reduced DME electro-oxidation activity on PtBi$_2$ relative to Pt/C is compared to the deconvoluted ECSA data, the substantially enhanced Pt(100) fraction relative to the substantially reduced Pt(110) fraction appears to be at odds with both single crystal Pt investigations in sulfuric acid, as well with theoretical results. As previously noted, these investigations indicate the Pt(100) favors DME electrooxidation due to enhanced dehydrogenation and C—O cleavage, as well as less susceptibility to surface poisoning due to stronger CO(ads) and OH(ads) bonding to the surface. While the improved tolerance to adsorbed intermediates is consistent with our experimental observations using PtBi$_2$—N and PtBi$_2$/C, residual subsurface alloy appears to impede individual site activity. Our results may be convoluted by the reduced binding strength of CO(ads) that has been found in previous investigations with PtBi and PtBi$_2$ bulk alloys. Such reduced bonding may negate the advantages of Pt(100) with respect to dehydration of bound intermediates. In particular, Pt single crystal investigations with Bi monolayers have shown that CO(ads) bonding to the surface of both Pt(100) and Pt(111) can be inhibited either by the third body mechanism (site blocking) or electronic effects (enhanced Bi-mediated oxygen transfer), respectively. The somewhat higher DME electrooxidation specific activity of PtBi$_2$/C relative to the dealloyed spherical NPs is associated with loss of Pt(110) sites and the growth of low index sites and not Pt(100). As previously indicated, there is little information available on how the variation in low index sites impacts electrocatalytic activity on NPs. Theoretical investigation of DME electrooxidation on single crystal PtBi$_2$ alloys and Pt skins on such alloys are needed to resolve these questions.

TABLE 2

Summary of CV data in sulfuric acid.

| Electrode | Current density at 0.8 V vs RHE (A/g$_{Pt}$) | Specific activity (uA/cm$^2$$_{gPt}$) |
|---|---|---|
| Dealloyed PtBi$_2$ nanoplatelets | 33.93 | 6.16 |
| PtBi$_2$/C | 13.64 | 15.97 |
| Pt/C | 7.06 | 22.06 |

2.7.3 Chronoamperometry

Chronoamperometry provides some information about the poisoning tolerance of the catalysts. CO$_{ads}$ species formed during the electrooxidation of DME tend to occupy the active sites that were preferable for the complete oxidation of DME. The only example of this type of study on highly dispersed electrocatalysts is the work of Y. Liu et al. (Liu, Y.; Mitsushima, S.; Ota, K.; Kamiya, N., Electro-oxidation of dimethyl ether on Pt/C and PtMe/C catalysts in sulfuric acid. *Electrochim. Acta* 2006, 51 (28), 6503-6509, hereby incorporated by reference in its entirety), who examined the poisoning tolerance of various PtMe (Me: Metal, Ru, Sn, Mo, etc.) electrocatalysts. Unfortunately, this work focused on collecting data at 0.4 V due to the substantial reduction in overpotential observed in these systems. This is because activity was substantially suppressed at 0.8 V (peak current potential) relative to Pt for all of these systems; suggesting that site blocking was extensive in these electrocatalysts. In our case, while the onset potential was not reduced to this extent, some reduction relative to Pt/C was achieved while maintaining good site accessibility and high peak currents at 0.8 V. Consequently, comparisons to previous data are not possible.

Figure 11A:
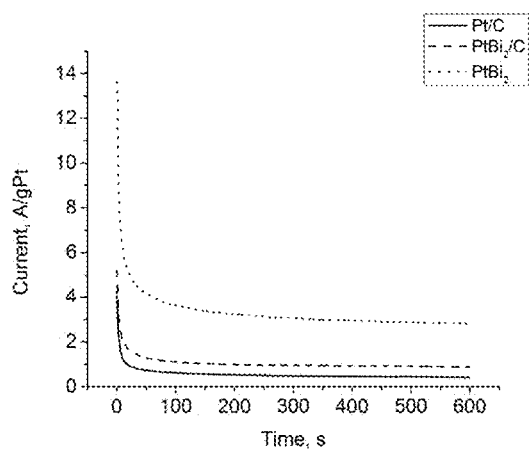
FIG. 11A and FIG. 11B show current vs time curves measured at 0.8 V vs RHE in 0.5 M sulfuric acid saturated with DME for 10 minutes at room temperature.
Figure 11B:
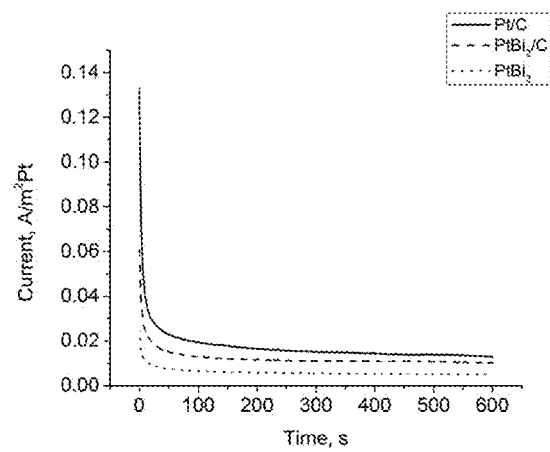

FIG. 11A and FIG. 11B shows the chronoamperometry results at the peak electro-oxidation potential of 0.8 V vs RHE on each electrode. The potential was held for 10 minutes. The current is observed to drop immediately as the measurement begins due to the formation of poisonous species from DME electro-oxidation. At this potential, the loss in current over time is related to the surface contaminated by CO$_{ads}$. From FIG. 11A, we observe that the PtBi$_2$ nanoplatelets reach a steady-state current of ~2.8 A/gPt after 10 minutes, PtBi$_2$/C maintains a ~0.88 A/gPt, and the Pt/C maintains ~0.41 A/gPt for Pt/C. As such, a minimum activity is maintained for all catalysts during CO$_{ads}$ oxidation, with PtBi$_2$ nanoplatelets performing nearly an order of magnitude better than Pt/C. This result is consistent with the substantially ECSA differences among the electrocatalysts and is exemplified by the ESCA normalized chronoamperometry results shown in FIG. 11B.

Figure 17A:
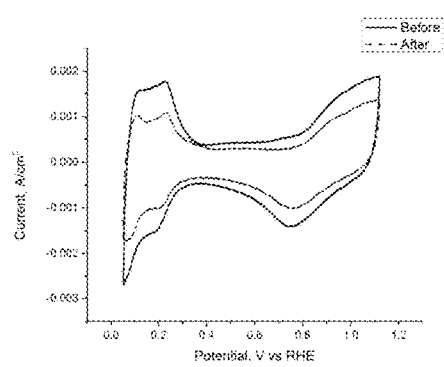
FIG. 17A-C shows comparisons of CVs in $N_2$-saturated 0.5 M $H_2SO_4$ at room temperature for each electrode before (solid) and after (dashed) chronoamperometry measurement in DME solution.
Figure 17B:
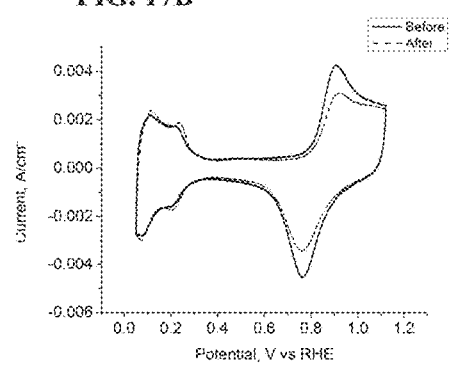
Figure 17C:
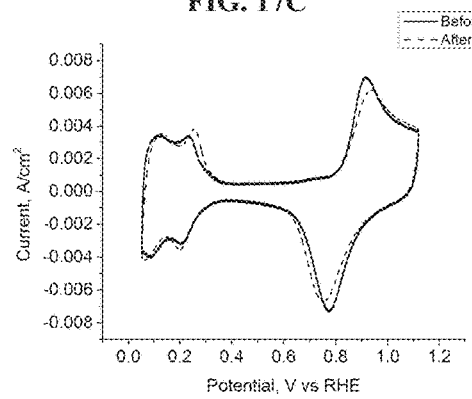

ECSA analyses were performed after chronoamperometry to evaluate changes in the active site distribution on the electrocatalyst surfaces. FIG. 17A-C compares proton stripping behavior before (solid) and after (dashed) for each electrode. From FIG. 17A, we observe that Pt/C has lost a significant portion of its active surface area after the DME chronoamperometry. The PtBi$_2$ alloy electrocatalysts show little change in area size or structure.

Despite the improved poison-tolerance of the dealloyed NPs, specific activity remains below that of pure Pt/C. Such contradictory behavior suggests that while the strength of CO(ads) bonding to the dealloyed PtBi$_2$ surfaces is not in the range to yield irreversibly bound intermediates, the rate of DME adsorption and C—O bond splitting is significantly impacted by the presence of Bi. Nevertheless, the enhanced surface area and poison tolerance make either PtBi$_2$—N or PtBi$_2$/C significant improvements over pure Pt/C.

3. Conclusions

This disclosure represents the first time that fundamental electrochemical data for DME electrooxidation is obtained using PtBi$_2$ alloy nanoparticles, specifically, and is one of the few studies with highly dispersed DME electrocatalyst in general. This disclosure demonstrates successful application of a unique nanoparticle synthesis scheme that is more scalable and sustainable than conventional approaches. In particular, stannous chloride is used as both reducing and stabilizing agent to produce thermodynamically stable PtBi$_2$ alloy nanoparticles in monodisperse, spherical morphology and less-uniform nanoplatelet morphology. This approach avoids the use of organic solvents or surfactants as well as energy-intensive in-situ electrochemical reduction or annealing process steps. Furthermore, the nanoparticles contain native (covalently bonded) surface charges that permit fully aqueous electrostatic assembly to fabricate macroscopic electrodes. The high electrocatalytic activity of these alloy nanoparticles is correlated to their detailed surface structure and composition. Activity enhancement is associated with the greater Pt surface area of the dealloyed structures rather than any increase in the local site activity. Consequently, the ECSA-normalized activity of the alloys is actually lower than that of Pt/C. To clarify the responsible mechanisms, we have summarized and integrated the results of previous experimental and theoretical investigations with single crystals. The increase in area, stability, and manufacturing ease make these novel nanoparticles particularly attractive for DME fuel cell application.

Various modifications of the present invention, in addition to those shown and described herein, will be apparent to those skilled in the art of the above description. Such modifications are also intended to fall within the scope of the appended claims.

It is appreciated that all reagents are obtainable from commercial sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference in its entirety.

The foregoing description is illustrative of particular aspects of the invention, but is not meant to be a limitation upon the practice thereof.

What is claimed:

1. A process for preparing a bismuth (Bi) nanoparticle, the process comprising:
    preparing an aqueous mixture comprising:
        an inorganic compound comprising tin chloride;
        an inorganic compound comprising Bi; and
        0.001 M HCl; and
    stirring the aqueous mixture at room temperature for three days;
wherein the process is entirely aqueous and results in spontaneous reduction of Bi to form the Bi nanoparticle and wherein negatively charged tin chloride adsorbs as a ligand at a surface of the nanoparticle to stabilize the nanoparticle.

2. The process of claim 1, wherein the inorganic compound comprising Bi is selected from $Bi_2O_3$ or $BiCl_3$.

3. The process of claim 1, wherein the inorganic compound comprising Bi is selected from a solution of $Bi_2O_3$ in HCl or a $BiCl_3$ solution.

4. The process of claim 1, wherein the tin chloride is $SnCl_2 \cdot 2H_2O$.

5. The process of claim 1, wherein the inorganic compound comprising tin chloride is a solution comprising $SnCl_2$ and HCl.

6. The process of claim 1, wherein the process does not comprise high temperature annealing.

7. The process of claim 1, wherein the process does not comprise the use of organic solvents.

8. The process of claim 1, wherein the process does not comprise hazardous reducing agents.

9. The process of claim 1, further comprising a step of:
    adding $PtCl_4$ to the aqueous mixture;
wherein the process results in spontaneous reduction of Bi and Pt and wherein excess negatively charged tin chloride adsorbs as a ligand at the surface of the nanoparticle to stabilize the nanoparticle.

10. The process of claim 9, wherein the inorganic compound comprising Bi is selected from $Bi_2O_3$ or $BiCl_3$.

11. The process of claim 9, wherein the inorganic compound comprising Bi is selected from a solution of $Bi_2O_3$ in HCl or a $BiCl_3$ solution.

12. The process of claim 9, wherein the tin chloride is $SnCl_2 \cdot 2H_2O$.

13. The process of claim 9, wherein the inorganic compound comprising tin chloride is a solution comprising $SnCl_2$ and HCl.

14. The process of claim 9, wherein the $PtCl_4$ is a solution comprising $PtCl_4$ and HCl.

15. The process of claim 9, wherein the process comprises a one-pot reduction of Pt and Bi to form Pt—Bi alloy nanoparticles.

16. The process of claim 9, wherein the process results in Pt and Bi reduction to form $PtBi_2$ alloy nanoparticles.

17. The process of claim 9, wherein the process does not comprise high temperature annealing.

18. The process of claim 9, wherein the process does not comprise the use of organic solvents.

19. The process of claim 9, wherein the process does not comprise hazardous reducing agents.

20. The process of claim 9, wherein the process is entirely aqueous.

21. The process of claim 1, wherein negatively charged tin chloride comprises one or more of $SnCl_3^-$ and $SnCl_4^{2-}$.

22. A process for synthesizing a platinum-bismuth (Pt—Bi) alloy nanoparticle, the process comprising:
    (a) preparing an aqueous mixture comprising:
        a composition comprising tin chloride;
        a composition comprising Bi; and
        0.001 M HCl;
    (b) stirring the aqueous mixture at room temperature for three days to provide a solution of Bi nanoparticles;
    (c) preparing a solution of platinum chloride and HCl;
    (d) preparing a solution of tin chloride and HCl; and
    (e) combining the solutions of steps (b), (c), and (d);
wherein the process is entirely aqueous and results in spontaneous reduction of Bi and Pt to form the Pt—Bi alloy nanoparticle and wherein negatively charged tin chloride adsorbs as a ligand at a surface of the nanoparticle to stabilize the nanoparticle.

23. A process for synthesizing a platinum-bismuth (Pt—Bi) alloy nanoparticle, the process comprising:
    (a) preparing an aqueous mixture comprising:
        a composition comprising tin chloride dissolved in HCl;
        a composition comprising Bi in HCl; and
        a composition comprising $PtCl_4$ dissolved in HCl; and
    (b) boiling the aqueous mixture of step (a) for one hour;
wherein the process is entirely aqueous and results in spontaneous reduction of Bi and Pt to form the Pt—Bi alloy nanoparticle and wherein negatively charged tin chloride adsorbs as a ligand at a surface of the nanoparticle to stabilize the nanoparticle.

* * * * *